United States Patent
Zhu et al.

(10) Patent No.: US 12,520,148 B2
(45) Date of Patent: *Jan. 6, 2026

(54) NETWORK SLICE ACCESS CONTROL METHOD AND APPARATUS

(71) Applicant: HUAWEI TECHNOLOGIES CO., LTD., Guangdong (CN)

(72) Inventors: Fangyuan Zhu, Beijing (CN); Yan Li, Beijing (CN); Hui Ni, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

This patent is subject to a terminal disclaimer.

(21) Appl. No.: 18/357,825

(22) Filed: Jul. 24, 2023

(65) Prior Publication Data
US 2023/0370844 A1 Nov. 16, 2023

Related U.S. Application Data

(63) Continuation of application No. 17/226,797, filed on Apr. 9, 2021, now Pat. No. 11,751,054, which is a
(Continued)

(30) Foreign Application Priority Data

Oct. 9, 2018 (CN) .......................... 201811172535.1

(51) Int. Cl.
*H04W 12/082* (2021.01)
*H04W 12/60* (2021.01)
(Continued)

(52) U.S. Cl.
CPC ......... *H04W 12/082* (2021.01); *H04W 12/66* (2021.01); *H04W 28/0289* (2013.01); *H04W 48/02* (2013.01); *H04W 60/06* (2013.01)

(58) Field of Classification Search
CPC .............. H04W 12/082; H04W 12/66; H04W 28/0289; H04W 48/02; H04W 60/06;
(Continued)

(56) References Cited

U.S. PATENT DOCUMENTS 9,615,253 B1 4/2017 Osborn
2018/0183765 A1 6/2018 Neumann et al.
(Continued)

FOREIGN PATENT DOCUMENTS

CN 106060900 A 10/2016
CN 107690791 A 2/2018
(Continued)

OTHER PUBLICATIONS

3GPP TR 22.830 V16.0.0 (Sep. 2018), "3rd Generation Partnership Project; Technical Specification Group Services and System Aspects; Feasibility Study on Business Role Models for Network Slicing (Release 16)," Sep. 2018, 25 pages.
(Continued)

*Primary Examiner* — Mazda Sabouri
(74) *Attorney, Agent, or Firm* — Fish & Richardson P.C.

(57) ABSTRACT

This application provides a network slice access control method, including: determining, by an access and mobility management function network element, first allowed network slice selection assistance information of a terminal device in a registration process to register the terminal device to a network; learning, by the access and mobility management function network element, of an authentication failure of a first network slice corresponding to first single network slice selection assistance information from the first allowed network slice selection assistance information.

17 Claims, 15 Drawing Sheets

Related U.S. Application Data continuation of application No. PCT/CN2019/108809, filed on Sep. 28, 2019.

(51) Int. Cl.
  H04W 28/02   (2009.01)
  H04W 48/02   (2009.01)
  H04W 60/06   (2009.01)

(58) Field of Classification Search
  CPC ....... H04W 48/18; H04W 8/065; H04W 8/18;
         H04W 76/12; H04W 12/06; H04W 12/61;
            H04W 48/06; H04W 76/18; H04W
            12/062; H04W 12/08; H04W 60/00;
                                H04W 76/19
  See application file for complete search history.

(56) References Cited

U.S. PATENT DOCUMENTS

| | | | |
|---|---|---|---|
| 2018/0227873 | A1 | 8/2018 | Vrzic et al. |
| 2018/0376446 | A1 | 12/2018 | Youn et al. |
| 2019/0174449 | A1* | 6/2019 | Shan .................... H04W 60/04 |
| 2020/0322884 | A1 | 10/2020 | Di Girolamo et al. |
| 2021/0092609 | A1 | 3/2021 | Wang |
| 2021/0410060 | A1* | 12/2021 | Ianev .................... H04W 48/18 |
| 2022/0046416 | A1* | 2/2022 | Suzuki ................. H04W 48/18 |

FOREIGN PATENT DOCUMENTS

| | | |
|---|---|---|
| CN | 108347729 A | 7/2018 |
| RU | 2533059 C2 | 11/2014 |
| RU | 2628317 C2 | 8/2017 |
| WO | 2017193553 A1 | 11/2017 |
| WO | 2018137873 A1 | 8/2018 |

OTHER PUBLICATIONS

3GPP TR 23.740 V0.5.0 (Aug. 2018), "3rd Generation Partnership Project; Technical Specification Group Services and System Aspects; Study on Enhancement of Network Slicing (Release 16)," 53 pages.
3GPP TS 23.501 V15.3.0 (Sep. 2018), "3rd Generation Partnership Project; Technical Specification Group Services and System Aspects; System Architecture for the 5G System; Stage 2( Release 15)," Sep. 2018, 226 pages.
3GPP TS 23.502 V15.3.0 (Sep. 2018), "3rd Generation Partnership Project; Technical Specification Group Services and System Aspects; Procedures for the 5G System; Stage 2 (Release 15)," 329 pages.
3GPP TS 24.501 V15.1.0 (Sep. 2018), "3rd Generation Partnership Project; Technical Specification Group Core Network and Terminals; Non-Access-Stratum (NAS) protocol for 5G System (5GS); Stage 3 (Release 15)," Sep. 2018, 398 pages.
3GPP TS 33.501 V15.2.0, "3rd Generation Partnership Project; Technical Specification Group Services and System Aspects; Security architecture and procedures for 5G system (Release 15)," Sep. 2018, 175 pages.
ETRI, "23.502—Alignment for 23.501 with 23.502 for PDU Session establishment," SA WG2 Meeting #124, S2-178899, Reno, Nevada, Nov. 27-Dec. 1, 2017, 12 pages.
Extended European Search Report issued in European Application No. 19870529.5 on Nov. 9, 2021, 8 pages.
HTC, "Handling of Allowed NSSAI," SA WG2 Meeting #S2-122, S2-175049, San Jose Del Cabo, Mexico, Jun. 26-30, 2017, 2 pages.
MediaTek Inc., "Correction to emergency registered," 3GPP TSG SA WG2 Meeting #128bis, S2-188811, Sophia Antipolis, Aug. 20-24, 2018, 23 pages.
Motorola Mobility, Lenovo, "Solution for network slice authentication and authorization," SA WG2 Meeting #128bis, S2-188261, Sophia Antipolis, France, Aug. 20-24, 2018, 5 pages.
Nokia, Alcatel-Lucent Shanghai Bell, Telecom Italia, "Network Slice access Subscription Management by a third party message flow P—Cr.," SA WG2 Meeting #122bis, S2-175694, Sophia Antipolis, France, Aug. 21-25, 2017, 12 pages.
Nokia, Nokia Shanghai Bell, "Slice Specific Authentication and Authorization using non 3GPP credentials—Solution," SA WG2 Meeting #128, S2-186613, Vilnius, Lithuania , Jul. 2-6, 2018, 5 pages.
Office Action issued in Chinese Application No. 201811172535.1 on Mar. 23, 2021, 15 pages (with English translation).
Office Action issued in Chinese Application No. 20181172535.1 on Nov. 3, 2021, 5 pages.
Office Action issued in Russian Application No. 2021112361/07(026358) on Jun. 29, 2022, 18 pages (with English translation).
PCT International Search Report and Written Opinion issued in International Application No. PCT/CN2019/108809 on Dec. 27, 2019, 14 pages (with English translation).
Qualcomm Incorporated, "Mechanism to limit frequency at which UE responds with SUCI in Identity Response message," 3GPP TSG-CT WG1 Meeting #111, C1-183720, Osaka, Japan, May 21-25, 2018, 18 pages.
Qualcomm Incorporated, "Solution for Slice Specific Authentication and Authorization using non 3GPP credentials," SA WG2 Meeting #128, S2-186674, Vilnius, Lithuania, Jul. 2-6, 2018, 2 pages.

\* cited by examiner

NETWORK SLICE ACCESS CONTROL METHOD AND APPARATUS

CROSS-REFERENCE TO RELATED APPLICATIONS

This application is a continuation of U.S. patent application Ser. No. 17/226,797, filed on Apr. 9, 2021, which is a continuation of International Application No. PCT/CN2019/108809, filed on Sep. 28, 2019. The International Application claims priority to Chinese Patent Application No. 201811172535.1, filed on Oct. 9, 2018. All of the aforementioned patent applications are hereby incorporated by reference in their entireties.

TECHNICAL FIELD

The present invention relates to the field of communications technologies, and in particular, to a network slice access control method and apparatus.

BACKGROUND

In the 5th generation (the 5th-Generation, 5G) communications era, hundreds of billions of internet of things devices access a network, and in different types of application scenarios, requirements on the network are differentiated. In a network slicing technology, network environments isolated from each other are provided for the different application scenarios by virtualizing an independent logical network on a same network infrastructure, so that network functions and features can be customized in the different application scenarios based on respective requirements, to ensure requirements of different services. Because terminal devices have different requirements on a rate, a capacity, a coverage rate, a delay, reliability, security, and bandwidth, the terminal device also need to access different network slices.

When the terminal device accesses a network slice, in addition to an authentication process that is based on a permanent identifier of the terminal device, there is also an authentication process based on a network slice granularity. In the prior art, even if authentication on the network slice fails, the terminal device may continue to attempt to initiate a packet data unit (Packet Data Unit, PDU) session establishment procedure in the network slice whose authentication fails. The authentication failure of the network slice also causes the PDU session to fail to be normally established. Consequently, the terminal device frequently accesses the network slice whose authentication fails, resulting in signaling wastes and network congestion.

SUMMARY

Embodiments of the present invention provide a network slice access control method and apparatus.

According to an aspect, an embodiment of this application provides a network slice access control method. The method includes:

An access and mobility management function network element (for example, an AMF network element) receives first information from a session management function network element (for example, an SMF network element), where the first information is associated with an authentication failure of a network slice (for example, a first network slice). The access and mobility management function network element sends second information to a terminal device based on the first information, where the second information is used to reject access of the terminal device to the network slice.

According to the foregoing method, the access and mobility management function network element may receive the first information associated with the authentication failure of the network slice, and then send the second information to the terminal device, to reject access of the terminal device to the network slice whose authentication fails, thereby avoiding network congestion caused by frequent access of the terminal device to the network slice whose authentication fails, and reducing signaling interworking between the terminal device and a network.

In a possible design, the access and mobility management function network element deletes single network slice selection assistance information (for example, S-NSSAI) corresponding to the network slice from first allowed network slice selection assistance information (for example, first Allowed NSSAI), to generate second allowed network slice selection assistance information (for example, second Allowed NSSAI). The access and mobility management function network element sends the second allowed network slice selection assistance information to the terminal device. Therefore, the terminal device may receive the second allowed network slice selection assistance information. Because the second allowed network slice selection assistance information does not include the single network slice selection assistance information corresponding to the network slice whose authentication fails, the terminal device cannot access the network slice whose authentication fails, thereby avoiding network congestion caused by frequent access of the terminal device to the network slice whose authentication fails, and reducing signaling interworking between the terminal device and a network.

In a possible design, the first information is used to indicate the authentication failure of the network slice; or the first information is used to indicate that a quantity of authentication failures of the network slice is greater than or equal to a first threshold; or the first information is used to instruct the access and mobility management function network element to delete the single network slice selection assistance information corresponding to the network slice from the first allowed network slice selection assistance information, to generate the second allowed network slice selection assistance information. Therefore, the terminal device cannot frequently access the network slice whose authentication fails, thereby reducing signaling interworking between the terminal device and a network, and avoiding network congestion.

In a possible design, the second information is used to request the terminal device to perform deregistration. Therefore, if the terminal device needs to re-initiate a session establishment procedure corresponding to the network slice whose authentication fails, the terminal device first initiates a registration procedure, obtains Allowed NSSAI from a network, and then obtains a valid authentication certificate, and initiates the session establishment procedure. Before re-initiating the session establishment procedure corresponding to the network slice whose authentication fails, the terminal device first initiates the registration procedure, so that the terminal device is prevented from frequently initiating a session establishment request, to avoid network congestion caused by malicious and frequent access of the terminal device to the network slice whose authentication fails.

In a possible design, the first information is used to indicate the authentication failure of the network slice; or the first information is used to indicate that a quantity of authentication failures of the network slice is greater than or equal to a first threshold; or the first information is used to instruct the access and mobility management function network element to request the terminal device to perform deregistration. Therefore, the access and mobility management function network element may learn of the authentication failure of the network slice, or the access and mobility management function network element learns that the quantity of authentication failures of the network slice is greater than or equal to the first threshold, or the access and mobility management function network element receives the indication information used to request the terminal device to perform deregistration. In this case, the access and mobility management function network element sends the second information to the terminal device, so that network congestion caused by frequent access of the terminal device to the network slice whose authentication fails is avoided, and signaling interworking between the terminal device and a network is reduced.

In a possible design, before that the access and mobility management function network element sends second information to the terminal device based on the first information, the method further includes: The access and mobility management function network element determines that a quantity of authentication failures is greater than or equal to a second threshold. Therefore, the access and mobility management function network element sends the second information to the terminal device after determining that the quantity of authentication failures is greater than or equal to the second threshold, so that the terminal device is prevented from frequently accessing the network slice whose authentication fails.

In a possible design, the access and mobility management function network element deletes network slice selection information of the network slice, where the network slice selection information includes at least one of a network slice instance identifier of the network slice or an NRF network element identifier. Therefore, after the network slice authentication fails, the access and mobility management function network element may delete the slice selection information of the network slice, thereby saving storage space of the access and mobility management function network element.

According to another aspect, this application further discloses a network slice access control method. The method includes: a session management function network element (for example, an SMF network element) receives first information from an authentication network element, where the first information is used to indicate an authentication failure of a network slice. The session management function network element sends second information to an access and mobility management function network element (for example, an AMF network element) based on the first information, where the second information is associated with the authentication failure of the network slice.

According to the foregoing method, the session management function network element may learn of the authentication failure of the network slice, and send the second information to the access and mobility management function network element, so that the access and mobility management function network element sends information to a terminal device, to reject access of the terminal device to the network slice whose authentication fails, thereby avoiding network congestion caused by frequent access of the terminal device to the network slice whose authentication fails, and reducing signaling interworking between the terminal device and a network.

In a possible design, the session management function network element sends third information to a terminal device, where the third information is used to indicate the authentication failure of the network slice, or the third information is used to indicate a cause of the authentication failure of the network slice. Therefore, the terminal device may learn of the authentication failure of the network slice.

In a possible design, the second information is used to indicate the authentication failure of the network slice; or the second information is used to indicate that a quantity of authentication failures of the network slice is greater than or equal to a first threshold; or the second information is used to instruct the access and mobility management function network element to delete single network slice selection assistance information corresponding to the network slice from first allowed network slice selection assistance information, to generate second allowed network slice selection assistance information; or the second information is used to instruct the access and mobility management function network element to request the terminal device to perform deregistration. Therefore, the access and mobility management function network element may learn of the authentication failure of the network slice, or the access and mobility management function network element learns that the quantity of authentication failures of the network slice is greater than or equal to the first threshold, or the access and mobility management function network element receives the indication information used to request to generate the second allowed network slice selection assistance information (for example, second Allowed NSSAI), or the access and mobility management function network element receives the indication information used to request the terminal device to perform deregistration. Then, the access and mobility management function network element sends the information to the terminal device, so that network congestion caused by frequent access of the terminal device to the network slice whose authentication fails is avoided, and signaling interworking between the terminal device and a network is reduced.

In a possible design, the second information includes timer information, where the timer information is used to instruct to reject access of the terminal device to the network slice before a timer expires. Therefore, the access and mobility management function network element rejects, based on the received timer information, access of the terminal device to the network slice before the timer expires.

In a possible design, the session management function network element receives timer information from the authentication network element; or the session management function network element obtains the timer information from the session management function network element. Therefore, the session management function network element may obtain the timer information.

In a possible design, the session management function network element sends the timer information to the terminal device. Therefore, the terminal device may obtain the timer information, and is disallowed, before the timer expires, access to the network slice.

In a possible design, the session management function network element determines that the quantity of authentication failures is greater than or equal to the first threshold. Therefore, after determining that the quantity of authentication failures is greater than or equal to the first threshold, the session management function network element sends, to the access and mobility management function network element, the information indicating that the quantity of authentication failures is greater than or equal to the first threshold.

According to another aspect, this application further discloses a network slice access control method. The method includes: A session management function network element (for example, an SMF network element) receives first information from an authentication network element, where the first information is used to indicate an authentication failure of a network slice. The session management function network element obtains timer information. Before a timer expires, the session management function network element rejects access of a terminal device to the network slice.

According to the foregoing method, the session management function network element may learn of the authentication failure of the network slice, and obtain the timer information, to reject access of the terminal device to the network slice whose authentication fails before the timer expires, thereby avoiding network congestion caused by frequent access of the terminal device to the network slice whose authentication fails, and reducing signaling interworking between the terminal device and a network.

In a possible design, the session management function network element sends the timer information to the terminal device. Therefore, the terminal device may obtain the timer information, and is disallowed, before the timer expires, access to the network slice.

In a possible design, the session management function network element receives the timer information from the authentication network element; or the session management function network element obtains the timer information from the session management function network element.

In a possible design, the session management function network element sends second information to the terminal device, where the second information is used to indicate the authentication failure of the network slice, or the second information is used to indicate a cause of the authentication failure of the network slice. Therefore, the terminal device may learn of the authentication failure of the network slice.

According to another aspect, this application further discloses a network slice access control method. The method includes: A terminal device obtains first information. The terminal device is disallowed access to a network slice based on the first information.

According to the foregoing method, the terminal device is disallowed, based on the first information, access to a network slice whose authentication fails, so that network congestion caused by frequent access of the terminal device to the network slice is avoided, and signaling interworking between the terminal device and a network is reduced.

In a possible design, the terminal device obtains the first information from the terminal device, where the first information includes second timer information. The terminal device receives second information from a session management function network element, where the second information is used to indicate an authentication failure of the network slice, or the second information is used to indicate a cause of an authentication failure of the network slice. The terminal device responds to the second information, and before a second timer expires, the terminal device is disallowed to access the network slice. Therefore, the terminal device may obtain the second timer information, and receive second cause value information from the session management function network element. The terminal device is disallowed, based on the second cause value information and the second timer information, performing access to the network slice again before the second timer expires. Therefore, network congestion caused by frequent access of the terminal device to the network slice is avoided, and signaling interworking between the terminal device and a network is reduced.

In a possible design, the terminal device receives the first information from the session management function network element, where the first information includes first timer information, and the first information is used to instruct to reject access of the terminal device to the network slice before a first timer expires. Therefore, the terminal device is disallowed, before the first timer expires and based on the first information, access to the network slice whose authentication fails.

In a possible design, the terminal device receives the first information from an access and mobility management function network element, where the first information is second allowed network slice selection assistance information generated by the access and mobility management function network element after deleting single network slice selection assistance information corresponding to the network slice from first allowed network slice selection assistance information; or the first information is used to request the terminal device to perform deregistration. Therefore, the terminal device may receive the second allowed network slice selection assistance information. Because the second allowed network slice selection assistance information does not include the single network slice selection assistance information corresponding to the network slice whose authentication fails, the terminal device cannot access the network slice whose authentication fails. Alternatively, after receiving a deregistration request, if the terminal device needs to re-initiate a session establishment procedure corresponding to the network slice whose authentication fails, the terminal device first initiates a registration procedure, obtains Allowed NSSAI from a network, and then obtains a valid authentication certificate, and initiates the session establishment procedure. Before re-initiating the session establishment procedure corresponding to the network slice whose authentication fails, the terminal device first initiates the registration procedure. Therefore, network congestion caused by frequent access of the terminal device to the network slice whose authentication fails is avoided, and signaling interworking between the terminal device and a network is reduced.

In a possible design, the terminal device receives third information from the session management function network element, where the third information is used to indicate the authentication failure of the network slice, or the third information is used to indicate a cause of the authentication failure of the network slice. Therefore, the terminal device may learn of the authentication failure of the network slice.

According to another aspect, an embodiment of this application provides a network slice access control apparatus. The apparatus has a function of implementing behavior of the access and mobility management function network element in the foregoing methods. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to process the apparatus to perform a corresponding function in the foregoing methods. The transceiver is configured to implement communication between the apparatus and a session management function network element/a terminal device/a UDM network element. The apparatus may further include a memory. The memory is configured to couple to the processor, and stores program instructions and data that are necessary for the apparatus.

According to another aspect, an embodiment of this application provides a network slice access control apparatus. The apparatus has a function of implementing behavior of the session management function network element in the foregoing methods. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to process the apparatus to perform a corresponding function in the foregoing methods. The transceiver is configured to implement communication between the apparatus and an access and mobility management function network element/a terminal device/an authentication network element. The apparatus may further include a memory. The memory is configured to couple to the processor, and stores program instructions and data that are necessary for the apparatus.

According to another aspect, an embodiment of this application provides a terminal device. The terminal device has a function of implementing behavior of the terminal device in the foregoing methods. The function may be implemented by hardware, or may be implemented by hardware executing corresponding software. The hardware or the software includes one or more modules corresponding to the foregoing function. In a possible design, a structure of the terminal device includes a processor and a transceiver. The processor is configured to process the terminal device to perform a corresponding function in the foregoing methods. The transceiver is configured to implement communication between the terminal device and an access and mobility management function network element/a session management function network element. The terminal device may further include a memory. The memory is configured to couple to the processor, and stores program instructions and data that are necessary for the terminal device.

According to another aspect, an embodiment of this application provides a computer-readable storage medium. The computer-readable storage medium stores instructions, and when the instructions are run on a computer, the computer is enabled to perform the methods in the foregoing aspects.

According to another aspect, an embodiment of this application provides a computer program product including instructions. When the instructions run on a computer, the computer performs the methods in the foregoing aspects.

According to another aspect, this application provides a chip system. The chip system includes a processor, configured to support the foregoing apparatus or a terminal device in implementing a function in the foregoing aspects, for example, generating or processing information in the foregoing methods. In a possible design, the chip system further includes a memory. The memory is configured to store program instructions and data that are necessary for the foregoing apparatus or the terminal device. The chip system may include a chip, or may include a chip and another discrete device.

BRIEF DESCRIPTION OF DRAWINGS

To describe the technical solutions in the embodiments of the present invention more clearly, the following describes the accompanying drawings that need to be used in the embodiments of the present invention or the background.

DESCRIPTION OF EMBODIMENTS

The following clearly describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of this application, "a plurality of" refers to two or more.

Figure 1:
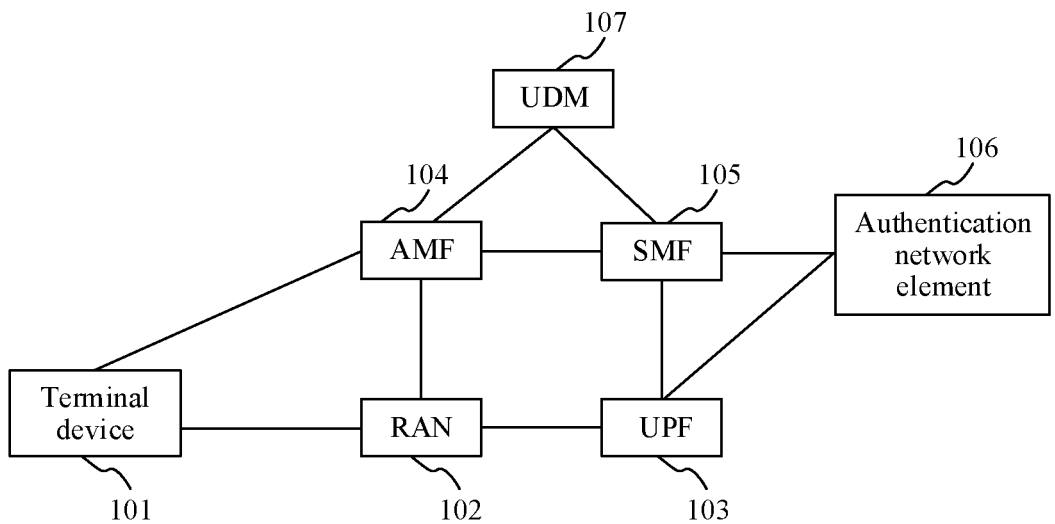
FIG. 1 is a schematic diagram of a 5G communications system according to an embodiment of this application.

FIG. 1 shows a schematic diagram of a 5G communications system according to an embodiment of this application. In a 5G mobile network architecture, a control plane function and a forwarding plane function of a mobile gateway are decoupled. The control plane function separated from the mobile gateway, and a mobility management entity (mobility management entity, MME) that is a conventional control network element, and the like in the 3rd generation partnership project (third generation partnership project, 3GPP) are combined to form a unified control plane (control plane). A user plane function (User plane function, UPF) network element can implement user plane functions (an SGW-U and a PGW-U) of a serving gateway (serving gateway, SGW) and a packet data network gateway (packet data network gateway, PGW). Further, a unified control plane network element may be split into an access and mobility management function (access and mobility management function, AMF) network element and a session management function (session management function, SMF) network element.

As shown in FIG. 1, the communications system includes at least a terminal device (terminal device) 101, an AMF network element 104, an SMF network element 105, and an authentication network element 106.

The terminal device 101 included in this system is not limited to a 5G network, and includes a mobile phone, an internet of things device, a smart household device, an industrial control device, a vehicle device, and the like. The terminal device may also be referred to as user equipment (User Equipment, UE), a mobile station (Mobile Station), a mobile station (Mobile), a remote station (Remote Station), a remote terminal (Remote Terminal), an access terminal (Access Terminal), a terminal device (User Terminal), or a terminal agent (User Agent). This is not limited herein. The terminal device may alternatively be a vehicle in vehicle-to-vehicle (Vehicle-to-vehicle, V2V) communication, a machine in machine type communication, or the like.

A radio access network (Radio Access Network, RAN) device 102 in this system is an apparatus configured to provide a wireless communication function for the terminal device 101. The RAN device 102 may include base stations in various forms, such as a macro base station, a micro base station (also referred to as a small cell), a relay station, and an access point. In systems that use different radio access technologies, names of a device that has a base station function may be different. For example, in an LTE system, the device is referred to as an evolved NodeB (evolved NodeB, eNB or eNodeB). In a 3rd generation (3rd Generation, 3G) system, the device is referred to as a NodeB (Node B). In a new generation system, the device is referred to as a gNB (gNodeB).

The AMF network element 104 in this system may be responsible for registration, mobility management, a tracking area update procedure, and the like of a terminal device. The AMF network element may also be referred to as an AMF device or an AMF entity.

The SMF network element 105 in this system may be responsible for session management of the terminal device. For example, the session management includes selection of a user plane device, reselection of a user plane device, internet protocol (internet protocol, IP) address allocation, quality of service (quality of service, QoS) control, and establishment, modification, or release of a session.

The authentication network element 106 in this system may be responsible for an authentication and authorization procedure, to implement network slice access control. For example, the authentication network element 106 may be an authentication and authorization (Authentication and Authorization, AA) function network element in a data network. For another example, the authentication network element 106 may be an authentication, authorization, and accounting (Authentication, Authorization and Accounting, AAA) function network element. For example, the authentication network element 106 may be located inside a 3GPP network, or may be located in a third-party network. For example, the authentication network element 106 may be an independent network element, or may be integrated in another network function (for example, an authentication server function (authentication server function, AUSF) or a network exposure function (network exposure function, NEF)). The authentication network element may also be referred to as an authentication device or an authentication entity.

Optionally, the 5G communications system further includes a UPF network element 103, which may implement functions such as forwarding, counting, and detection of a packet of the terminal. The UPF network element may also be referred to as a UPF device or a UPF entity.

Optionally, the 5G communications system further includes a unified data management function (Unified Data Management, UDM) network element 107. The UDM network element 107 can store subscription data of the terminal. For example, the subscription data of the terminal includes subscription data related to mobility management and subscription data related to session management. The UDM network element may also be referred to as a UDM device or a UDM entity.

The foregoing network elements may be network elements implemented on dedicated hardware, or may be software instances run on dedicated hardware, or may be instances of virtualization functions on a proper platform. For example, the foregoing virtualization platform may be a cloud platform.

In addition, the embodiments of this application may also be applicable to another future-oriented communications technology. Network architectures and service scenarios described in this application are intended to describe the technical solutions in this application more clearly, but are not intended to limit the technical solutions provided in this application. A person of ordinary skill in the art may know that as the network architectures evolve and a new service scenario emerges, the technical solutions provided in this application are also applicable to a similar technical problem.

The following uses the 5G communications system shown in FIG. 1 as an example to describe the technical solutions in this application in detail by using some embodiments. The following several embodiments may be combined with each other, and a same or similar concept or process may not be described repeatedly in some embodiments.

Figure 2:
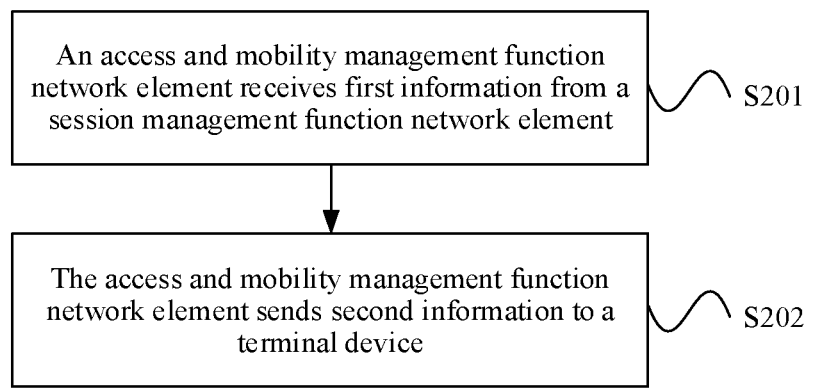
FIG. 2 shows a network slice access control method according to an embodiment of this application.

FIG. 2 shows a network slice access control method according to an embodiment of this application. According to this method, a network may learn of a network slice whose authentication fails, and rejects access of a terminal device to the network slice whose authentication fails, thereby avoiding network congestion caused by frequent access of the terminal device to the network slice whose authentication fails, and reducing signaling interworking between the terminal device and the network. As shown in FIG. 2, the method may include the following steps.

S201. An access and mobility management function network element receives first information from a session management function network element, where the first information is associated with an authentication failure of a network slice.

For example, the access and mobility management function network element is the AMF network element 104 in FIG. 1, and the session management function network element is the SMF network element 105 in FIG. 1.

For example, the first information is used to indicate the authentication failure of the network slice. For example, this will be further described with reference to FIG. 3 to FIG. 8B below. Alternatively, the first information is used to indicate that a quantity of authentication failures of the network slice is greater than or equal to a first threshold. For example, this will be further described with reference to FIG. 5A to FIG. 8B below. Alternatively, the first information is used to instruct the access and mobility management function network element to delete single network slice selection assistance information corresponding to the network slice from first allowed network slice selection assistance information, to generate second allowed network slice selection assistance information. For example, this will be further described with reference to FIG. 3 to FIG. 5B below. Alternatively, the first information is used to instruct the access and mobility management function network element to request the terminal device to perform deregistration. For example, this will be further described with reference to FIG. 6 to FIG. 8B below.

Optionally, the first information includes cause value information, used to indicate that a cause of the authentication failure of the network slice is: A certificate used to perform authentication on the network slice is incorrect or invalid.

It should be noted that the authentication on the network slice that is described in the present invention is authentication that is based on a network slice granularity. When a terminal device accesses the network slice, first authentication is authentication that is based on a permanent identifier of the terminal device. Therefore, the authentication on the network slice in the present invention may also be referred to as secondary authentication on the network slice.

S202. The access and mobility management function network element sends second information to a terminal device based on the first information, where the second information is used to reject access of the terminal device to the network slice.

For example, the terminal device is the terminal device 101 in FIG. 1.

Optionally, the access and mobility management function network element learns of the authentication failure of the network slice based on the first information, and sends the second information to the terminal device. The second information is used to reject access of the terminal device to the network slice.

For example, the second information sent by the access and mobility management function network element to the terminal device may be either of the following two manners.

Manner 1: The access and mobility management function network element deletes, from the first allowed network slice selection assistance information (Allowed Network Slice Selection Assistance Information, Allowed NSSAI), the single network slice selection assistance information (Single Network Slice Selection Assistance Information, S-NSSAI) corresponding to the network slice whose authentication fails, to generate the second Allowed NSSAI. In other words, the second Allowed NSSAI does not include the S-NSSAI corresponding to the network slice whose authentication fails. The access and mobility management function network element sends the second Allowed NSSAI to the terminal device.

For example, the first Allowed NSSAI is obtained by the terminal device in a registration procedure. After the terminal device is registered with the network, the network determines, based on information such as subscription data, a roaming agreement, and a local configuration of the terminal device, NSSAI (namely, the first Allowed NSSAI) allowed in the current network, and then sends the first Allowed NSSAI to the terminal device by using a registration accept message. Because the NSSAI is a set of S-NSSAI, the first Allowed NSSAI includes one or more pieces of S-NSSAI. The S-NSSAI is used to identify a type of a network slice. The terminal device may initiate a session establishment procedure corresponding to a network slice identified by any piece of S-NSSAI in the Allowed NSSAI.

For example, the first Allowed NSSAI includes S-NSSAI-1 and S-NSSAI-2. The terminal device initiates a session establishment procedure of a network slice identified by the S-NSSAI-1, the access and mobility management function network element receives the first information from the session management function network element by performing step S201, and the first information is used to indicate an authentication failure of the network slice identified by the S-NSSAI-1. The access and mobility management function network element deletes the S-NSSAI-1 from the first Allowed NSSAI, to generate second Allowed NSSAI. The second Allowed NSSAI does not include the S-NSSAI-1, that is, the second Allowed NSSAI includes the S-NSSAI-2. The access and mobility management function network element sends the second Allowed NSSAI to the terminal device. Therefore, the terminal device cannot initiate the session establishment procedure corresponding to the network slice identified by the S-NSSAI-1.

Therefore, in this manner, the second information is the foregoing second Allowed NSSAI. This will be further described with reference to FIG. 3 to FIG. 5B below.

Manner 2: The second information is used to request the terminal device to perform deregistration.

For example, after receiving a deregistration request message, the terminal device is deregistered from the network, and the terminal device deletes the Allowed NSSAI. This will be further described with reference to FIG. 6 to FIG. 8B below. For example, the authentication failure is caused by an invalid authentication certificate. After the terminal device is deregistered, when the terminal device needs to re-initiate the session establishment procedure corresponding to the network slice whose authentication fails, the terminal device first initiates the registration procedure, obtains Allowed NSSAI from the network, and then obtains a valid authentication certificate, and initiates the session establishment procedure. Before re-initiating the session establishment procedure corresponding to the network slice whose authentication fails, the terminal device first initiates the registration procedure, so that the terminal device is prevented from frequently initiating a session establishment request, to avoid network congestion caused by malicious and frequent access of the terminal device to the network slice whose authentication fails.

Therefore, according to the method in this embodiment of the present invention, the access and mobility management function network element may receive the first information associated with the authentication failure of the network slice, and then send the second information to the terminal device, to reject access of the terminal device to the network slice whose authentication fails, thereby avoiding network congestion caused by frequent access of the terminal device to the network slice whose authentication fails, and reducing signaling interworking between the terminal device and the network.

Figure 3:
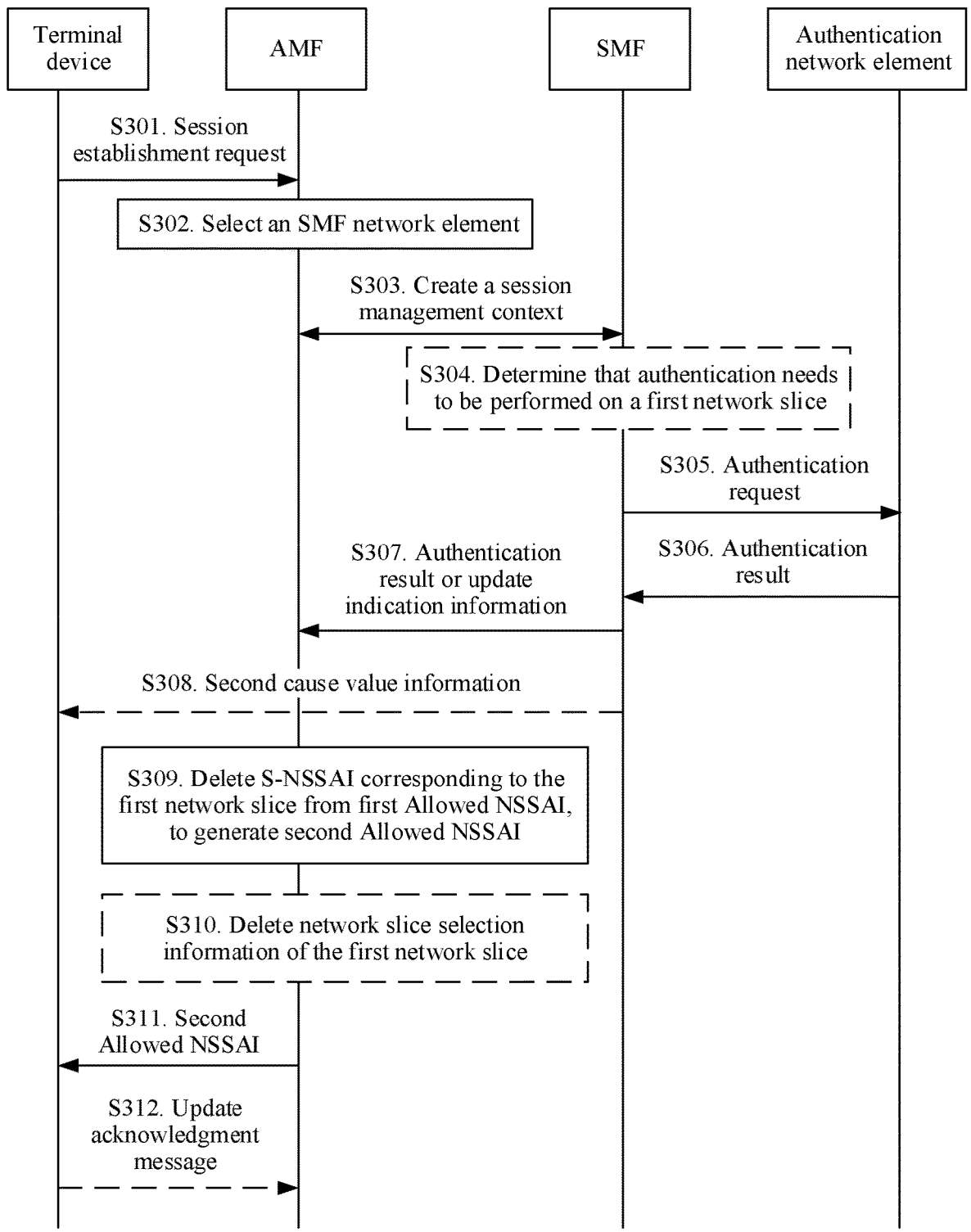
FIG. 3 is a flowchart of a network slice access control method according to an embodiment of this application.

FIG. 3 is a flowchart of a network slice access control method according to an embodiment of this application. The flowchart shown in FIG. 3 describes a method in the manner 1 of step S202 in FIG. 2: After receiving the first information associated with the authentication failure of the first network slice, the AMF network element sends the second Allowed NSSAI to the terminal device. The second Allowed NSSAI does not include the S-NSSAI corresponding to the first network slice. Therefore, network congestion caused by frequent access of the terminal device to the first network slice is avoided. As shown in FIG. 3, the method may include the following steps.

S301. A terminal device sends a session establishment request to an AMF network element. Correspondingly, the AMF network element receives the session establishment request from the terminal device.

For example, the terminal device is the terminal device 101 in FIG. 1, and the AMF network element is the AMF network element 104 in FIG. 1.

For example, the terminal device sends the session establishment request to the AMF network element based on first Allowed NSSAI obtained in a registration procedure. The first Allowed NSSAI includes S-NSSAI of a first network slice. For example, the session establishment request message includes a PDU session identifier (identifier, ID) and the S-NSSAI of the first network slice.

Optionally, the session establishment request further includes a certificate used to perform authentication on the first network slice.

Optionally, in the registration procedure, if a network does not determine, for the S-NSSAI of the first network slice, a network slice instance identifier (network slice instance identifier, NSI ID) corresponding to the S-NSSAI, the AMF network element determines an NSI ID corresponding to the S-NSSAI. In other words, the AMF network element determines an NSI serving the terminal device.

S302. The AMF network element selects an SMF network element.

For example, the SMF network element is the SMF network element 105 in FIG. 1.

For example, the AMF network element selects the SMF network element for a session based on the S-NSSAI of the first network slice in the session establishment request message. The SMF network element is an SMF network element in the first network slice.

S303. The AMF network element requests the SMF network element to create a session management context.

For example, the AMF network element triggers, by invoking a session management context request (for example, an Nsmf_PDUSession_CreateSMContext request) service, the SMF network element to create the session management context for the terminal device.

S305. The SMF network element sends an authentication request to an authentication network element. Correspondingly, the authentication network element receives the authentication request from the SMF network element.

For example, the authentication network element is the authentication network element 106 in FIG. 1.

For example, the authentication request includes the certificate used to perform authentication on the first network slice.

Optionally, if there is no interface for direct communication between the SMF network element and the authentication network element, the SMF network element sends the authentication request message to the authentication network element by using a UPF network element.

Optionally, if the session establishment request in step S301 does not include the certificate used to perform authentication on the first network slice, the SMF network element may obtain the certificate by sending a request message to the terminal device, and then send the certificate to the authentication network element.

S306. The authentication network element sends an authentication result to the SMF network element. Correspondingly, the SMF network element receives the authentication result from the authentication network element. The authentication result is used to indicate an authentication failure of the first network slice.

For example, the authentication network element sends the authentication result to the SMF network element by using an authentication response message.

Optionally, the authentication response message further includes first cause value information. Optionally, the first cause value information is used to indicate that a cause of the authentication failure of the first network slice is: The certificate used to perform authentication on the first network slice is incorrect or invalid.

S307. The SMF network element sends the authentication result or update indication information to the AMF network element. Correspondingly, the AMF network element receives the authentication result or the update indication information from the SMF network element.

For example, the SMF network element sends, by invoking an information transfer (for example, Namf_Communication_NN2MessageTransfer) service, the authentication result or the update indication information obtained by the SMF network element in step S306 to the AMF network element. The update indication information is used to instruct the AMF network element to delete the S-NSSAI corresponding to the first network slice from the first Allowed NSSAI, to generate second Allowed NSSAI.

With reference to the descriptions of steps S306 and S307, the session management function network element (the SMF network element) receives first information (the authentication result) from the authentication network element. The first information is used to indicate the authentication failure of the network slice (the first network slice). The session management function network element sends second information (the authentication result or the update indication information) to the access and mobility management function network element (the AMF network element) based on the first information. The second information is associated with the authentication failure of the network slice (the first network slice). In other words, the second information associated with the authentication failure of the network slice (the first network slice) in FIG. 2 may be the authentication result of the first network slice or the update indication information in step S307.

S309. The AMF network element deletes S-NSSAI corresponding to a first network slice from first Allowed NSSAI, to generate second Allowed NSSAI.

For example, the AMF network element learns of the authentication failure of the first network slice based on the authentication result in step S307, and the AMF network element deletes the S-NSSAI corresponding to the first network slice from the first Allowed NSSAI, to generate the second Allowed NSSAI. Alternatively, the AMF network element deletes, based on the update indication information in step S307, the S-NSSAI corresponding to the first network slice from the first Allowed NSSAI, to generate the second Allowed NSSAI. For example, the first Allowed NSSAI is determined in the registration procedure. For example, the AMF network element stores the first Allowed NSSAI in a context of the terminal device. For example, the first Allowed NSSAI includes S-NSSAI-1 and S-NSSAI-2. Because the S-NSSAI-1 corresponds to the authentication failure of the first network slice, the second Allowed NSSAI determined by the AMF network element does not include the S-NSSAI-1. In other words, the second Allowed NSSAI includes the S-NSSAI-2. The access and mobility management function network element sends the second Allowed NSSAI to the terminal device.

S311. The AMF network element sends the second Allowed NSSAI to the terminal device. Correspondingly, the terminal device receives the second Allowed NSSAI from the AMF network element.

For example, the AMF network element may send the second Allowed NSSAI to the terminal device by using a configuration update command message (for example, a Configuration Update Command message).

Alternatively, for example, the AMF network element may send the second Allowed NSSAI to the terminal device in a PDU session establishment procedure.

In other words, steps S309 and S311 may be performed after step S307 in the PDU session establishment procedure, or may be performed in a configuration update procedure after the session establishment procedure ends.

S312. The terminal device sends an update acknowledgment message to the AMF network element. Correspondingly, the AMF network element receives the update acknowledgment message from the terminal device.

For example, the terminal device acknowledges to the AMF network element by using a configuration update complete message (for example, a UE Configuration Update complete message): The terminal device receives the second Allowed NSSAI.

Step S312 is an optional step.

Therefore, according to the method in this embodiment of the present invention, after receiving the first information (namely, the authentication result or the update indication information in FIG. 3) associated with the authentication failure of the first network slice, the AMF network element sends the second Allowed NSSAI to the terminal device. The second Allowed NSSAI does not include the S-NSSAI corresponding to the first network slice. Therefore, network congestion caused by frequent access of the terminal device to the first network slice is avoided, and signaling interworking between the terminal device and a network is reduced.

Optionally, before step S305, the method may further include the following step.

S304. The SMF network element determines that authentication needs to be performed on the first network slice.

In a possible implementation, the SMF network element determines, based on subscription information of the terminal device, that authentication needs to be performed on the first network slice. For example, the subscription information includes subscribed S-NSSAI of the terminal device. Optionally, the subscription information further includes indication information, used to indicate whether the network slice corresponding to the S-NSSAI needs to perform a network slice authentication procedure. Because the first network slice is a subscribed allowed network slice, the subscribed S-NSSAI includes the S-NSSAI of the first network slice. Therefore, the SMF network element may determine, based on indication information that is in the subscription information and that indicates that the first network slice corresponding to the S-NSSAI needs to perform authentication, that authentication needs to be performed on the first network slice.

In another possible implementation, the SMF network element determines, based on local configuration information of the SMF network element, that authentication needs to be performed on the first network slice.

In the method, the SMF network element authenticates the first network slice on which authentication needs to be performed, and may not perform subsequent steps S305 and S306 for a network slice on which authentication does not need to be performed, thereby reducing signaling interworking between the SMF network element and the authentication network element.

Optionally, after step S307, the method may further include the following step.

S308. The SMF network element sends second cause value information to the terminal device. Correspondingly, the terminal device receives the second cause value information from the SMF network element.

For example, the SMF network element determines that establishment of a PDU session fails, and generates a PDU session establishment reject message. The message includes the second cause value information. The SMF network element sends the second cause value information to the AMF network element by using the PDU session establishment reject message, and then the AMF network element sends the second cause value information to the terminal device by using the PDU session establishment reject message.

A second cause value may be used to indicate a cause of the PDU session establishment failure. For example, the second cause value information is used to indicate the authentication failure of the first network slice, or the second cause value information is used to indicate the cause of the authentication failure of the first network slice. Optionally, the cause of the authentication failure of the first network slice is: The certificate used to perform authentication on the first network slice is incorrect or invalid.

Therefore, the terminal device may learn of the cause of the authentication failure of the first network slice. For example, assuming that the cause of the authentication failure of the first network slice is that the certificate used to perform authentication on the first network slice is incorrect or invalid, the terminal device may use another certificate when re-initiating the session establishment request.

Optionally, after step S307, the method may further include the following step.

S310. The AMF network element deletes network slice selection information of the first network slice.

For example, the slice selection information of the first network slice includes at least one of the NSI ID corresponding to the first network slice or an identifier of a network repository function (network repository function, NRF) network element.

Therefore, after the network slice authentication fails, the AMF network element may delete the slice selection information of the first network slice, thereby saving storage space of the AMF network element.

Figure 4A:
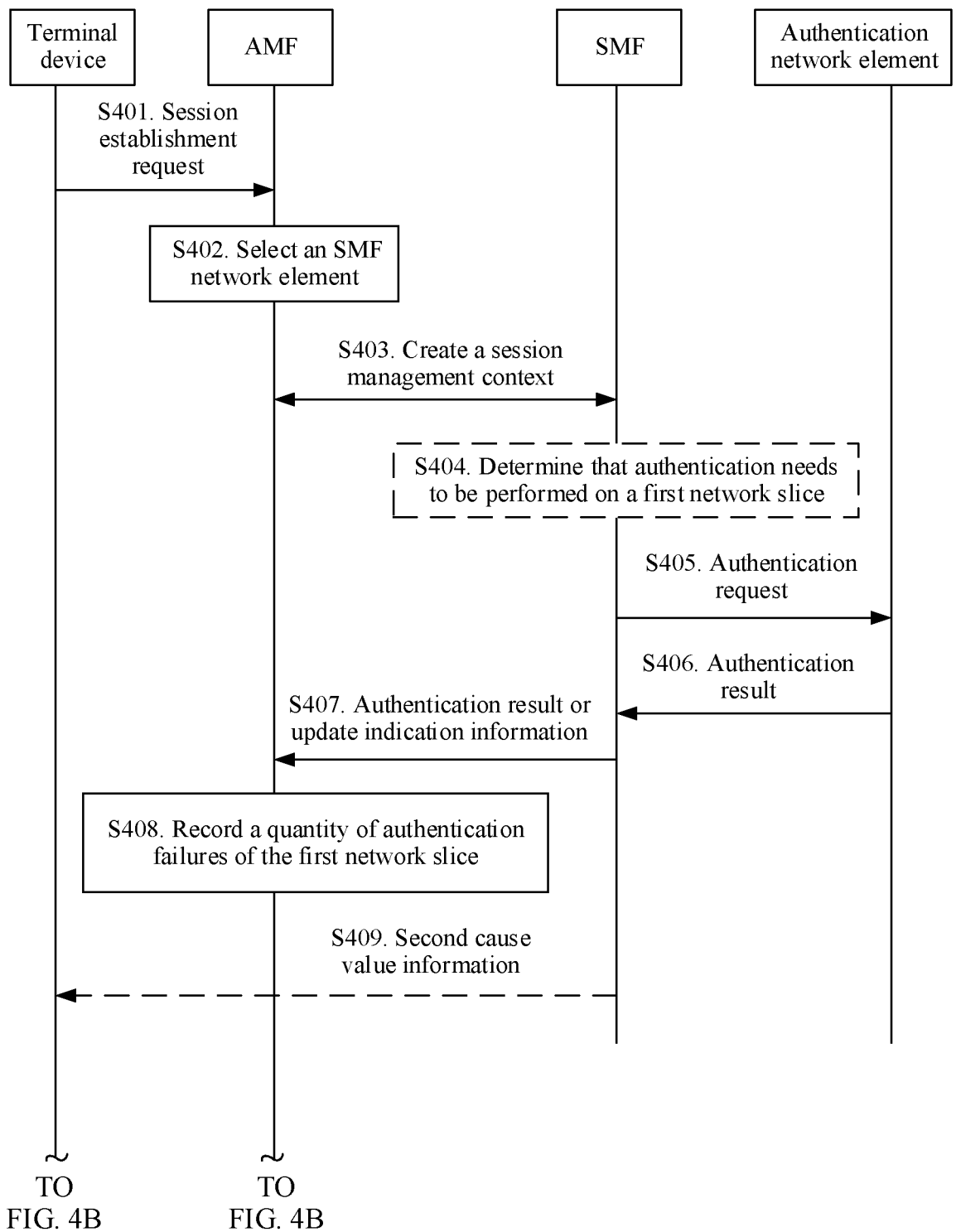
FIG. 4A and FIG. 4B are a flowchart of another network slice access control method according to an embodiment of this application.
Figure 4B:
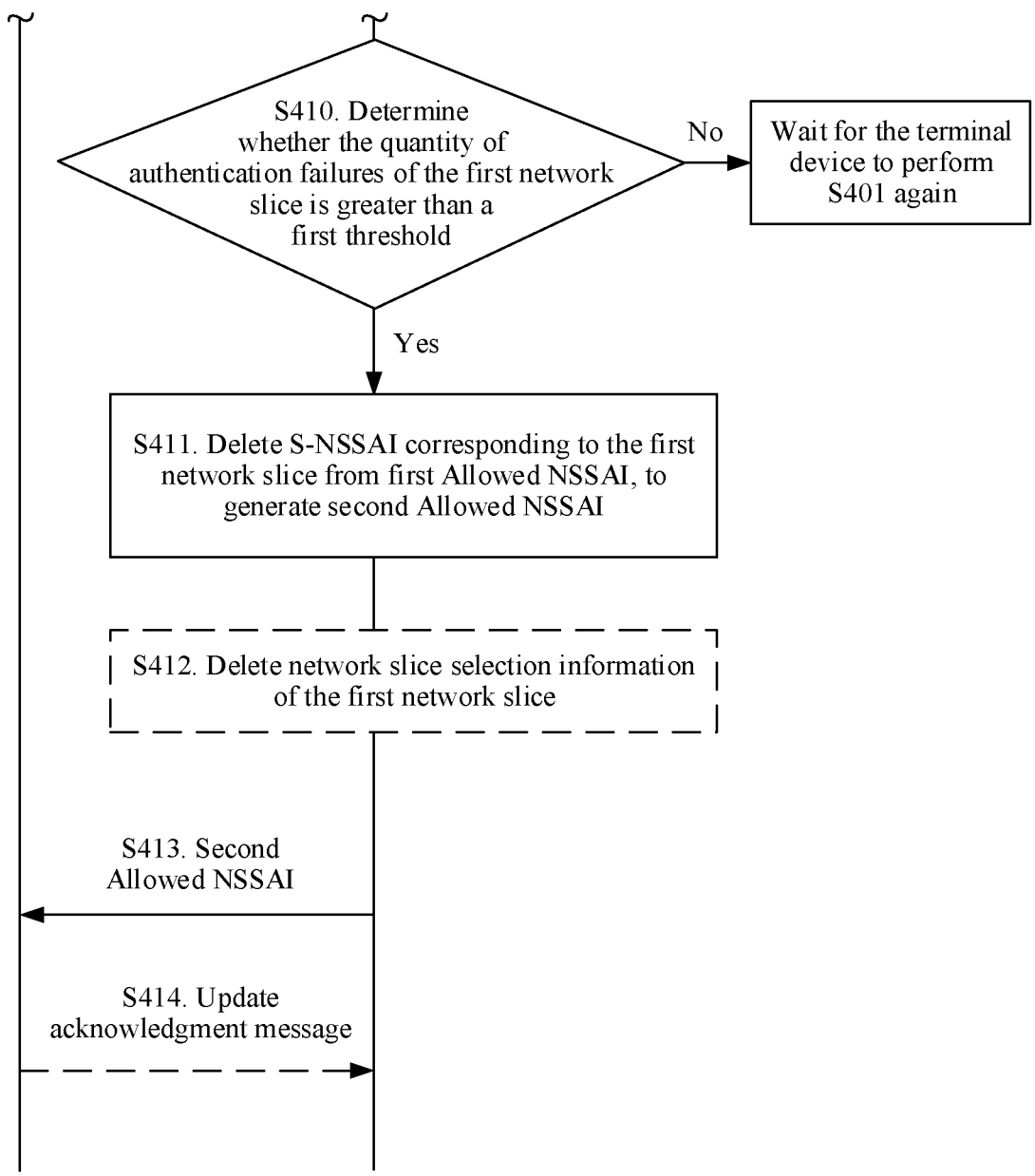

FIG. 4A and FIG. 4B are a flowchart of another network slice access control method according to an embodiment of this application. The flowchart shown in FIG. 4A and FIG. 4B describes the method in the manner 1 of step S202 in FIG. 2. A difference between FIGS. 4A and 4B and FIG. 3 lies in that: FIG. 4A and FIG. 4B are based on the method shown in FIG. 3, and before the AMF network element generates the second Allowed NSSAI, the AMF network element determines that a quantity of authentication failures of the first network slice is greater than or equal to a first threshold. FIG. 4A and FIG. 4B are described with reference to FIG. 3. As shown in FIG. 4A and FIG. 4B, the method may include the following steps.

For steps S401 to S407, refer to the descriptions of steps S301 to S307 in FIG. 3. Details are not described herein again.

The method shown in FIG. 4A and FIG. 4B further includes the following steps.

S408. The AMF network element records a quantity of authentication failures of the first network slice.

For example, if the AMF network element receives authentication results for K times (where K is a positive integer), the AMF network element records that the quantity of authentication failures of the first network slice is K.

Optionally, after step S407, the method may further include step S409. For step S409, refer to the description of step S308 in FIG. 3. Details are not described herein again.

It should be noted that a sequence of performing step S408 and step S409 is not limited in this embodiment of this application. In other words, in this embodiment of this application, S408 may be performed before S409. Alternatively, S409 may be performed before S408. Alternatively, S408 and S409 may be performed simultaneously.

S410. The AMF network element determines whether the quantity of authentication failures of the first network slice is greater than a first threshold.

For example, the AMF network element locally stores the first threshold, and the first threshold is a positive integer.

For example, when determining that the quantity of authentication failures of the first network slice is less than the first threshold, the AMF network element waits for the terminal device to re-initiate a session establishment request, in other words, waits for the terminal device to perform S401 again. For example, when the terminal device performs step S401 again, the terminal device may change the certificate used for authentication, and re-initiate a PDU session establishment procedure corresponding to the first network slice. When the AMF network element determines that the quantity of authentication failures of the first network slice is greater than the first threshold, the method shown in FIG. 4A and FIG. 4B further includes steps S411 to S414. For steps S411 to S414, refer to the descriptions of steps S309 to S312 in FIG. 3. Details are not described herein again. When determining that the quantity of authentication failures of the first network slice is equal to the first threshold, the AMF network element may wait for the terminal device to perform step S401 again, or perform steps S411 to S414. This may be determined based on an actual situation or configuration, and is not limited in this application.

Therefore, according to the method in this embodiment of the present invention, after receiving the first information (namely, the authentication result or the update indication information in FIG. 4A) associated with the authentication failure of the first network slice, the AMF network element records the quantity of authentication failures of the first network slice. When determining that the quantity of authentication failures of the first network slice is greater than or equal to the first threshold, the AMF network element sends the second Allowed NSSAI to the terminal device. The second Allowed NSSAI does not include the S-NSSAI corresponding to the first network slice. Therefore, when the quantity of authentication failures of the first network slice is less than the first threshold, the AMF network element does not immediately send the second Allowed NSSAI to the terminal device, but allows the terminal device to change the certificate used for authentication, and to attempt to re-initiate the PDU session corresponding to the first network slice. This increases a possibility that the authentication succeeds. When the quantity of authentication failures of the first network slice is greater than or equal to the first threshold, if the authentication still fails, the second Allowed NSSAI is sent to the terminal device, thereby avoiding network congestion caused by frequent access of the terminal device to the first network slice, and reducing signaling interworking between the terminal device and a network.

Figure 5A:
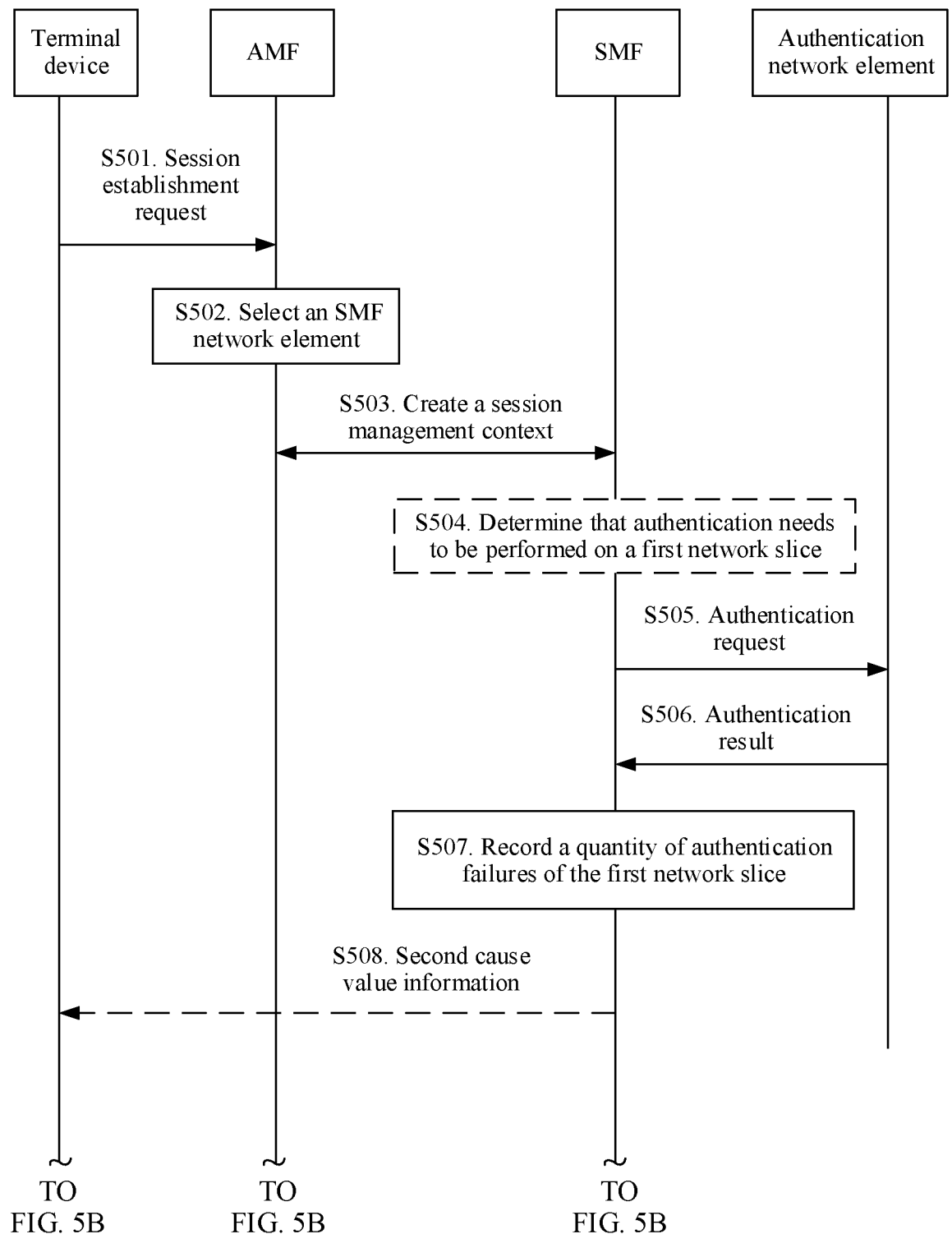
FIG. 5A and FIG. 5B are a flowchart of another network slice access control method according to an embodiment of this application.
Figure 5B:
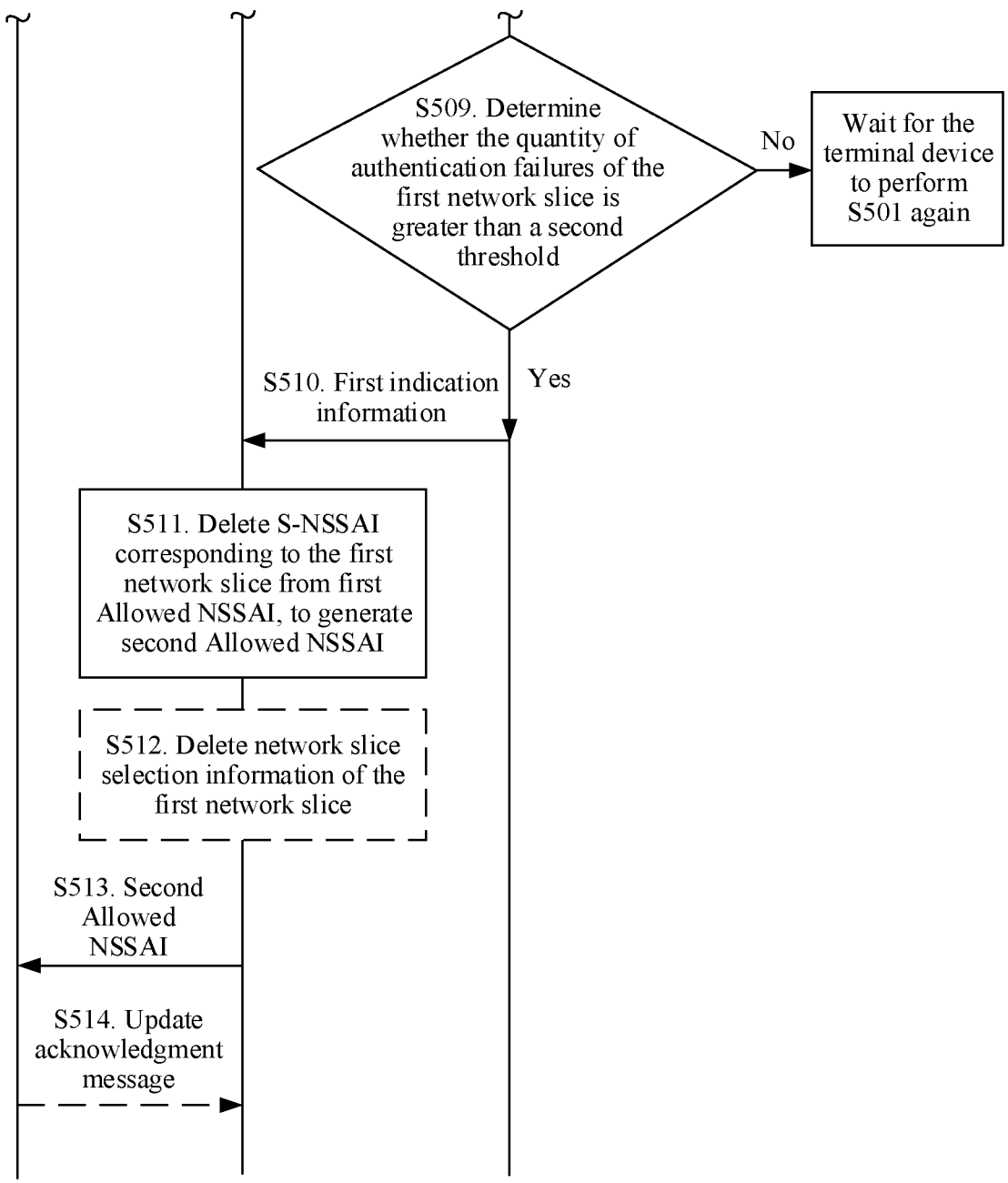

FIG. 5A and FIG. 5B are a flowchart of another network slice access control method according to an embodiment of this application. The flowchart shown in FIG. 5A and FIG. 5B describes the method in the manner 1 of step S202 in FIG. 2. A difference between FIG. 5A and FIG. 4A lies in that: In FIG. 4A, before the AMF network element generates the second Allowed NSSAI, the AMF network element determines that the quantity of authentication failures of the first network slice is greater than or equal to the first threshold; in FIG. 5A, before an AMF network element generates second Allowed NSSAI, an SMF network element determines that a quantity of authentication failures of the first network slice is greater than or equal to a second threshold, and the AMF network element generates the second Allowed NSSAI based on an instruction of the SMF network element. FIG. 5A and FIG. 5B are described with reference to FIG. 3, FIG. 4A, and FIG. 4B. As shown in FIG. 5A and FIG. 5B, the method may include the following steps.

For steps S501 to S506, refer to the descriptions of steps S401 to S406 in FIG. 4A. Details are not described herein again.

The method shown in FIG. 5A and FIG. 5B further includes the following steps.

S507. The SMF network element records a quantity of authentication failures of the first network slice.

For example, if the SMF network element receives authentication results for N times (where N is a positive integer), the SMF network element records that the quantity of authentication failures of the first network slice is N.

Optionally, after step S507, the method may further include step S508. For step S508, refer to the description of step S409 in FIG. 4A. Details are not described herein again.

S509. The SMF network element determines whether the quantity of authentication failures of the first network slice is greater than or equal to a second threshold.

For example, the SMF network element locally stores the second threshold, and the second threshold is a positive integer.

For example, when determining that the quantity of authentication failures of the first network slice is less than the second threshold, the SMF network element waits for the terminal device to re-initiate a session establishment request, in other words, waits for the terminal device to perform S501 again. For example, when the terminal device performs step S501 again, the terminal device may change the certificate used for authentication, and re-initiate a PDU session establishment procedure corresponding to the first network slice. When the SMF network element determines that the quantity of authentication failures of the first network slice is greater than the second threshold, the method shown in FIG. 5A and FIG. 5B further includes steps S510 to S514. When determining that the quantity of authentication failures of the first network slice is equal to the second threshold, the SMF network element may wait for the terminal device to perform step S501 again, or perform steps S510 to S514. This may be determined based on an actual situation or configuration, and is not limited in this application.

S510. The SMF network element sends first indication information to the AMF network element. Correspondingly, the AMF network element receives the first indication information from the SMF network element.

For example, the first indication information is used to indicate that the quantity of authentication failures of the first network slice is greater than or equal to the second threshold; or the first indication information is used to instruct the AMF network element to determine second Allowed NSSAI; or the first indication information is used to indicate the authentication failure of the first network slice.

In other words, the first information received by the AMF network element from the SMF network element in step S202 in FIG. 2 is the first indication information. For example, the first information is used to indicate that the quantity of authentication failures of the first network slice is greater than or equal to the second threshold; or the first information is used to instruct the AMF network element to determine the second Allowed NSSAI; or the first information is used to indicate the authentication failure of the first network slice.

For example, the SMF sends the first indication information to the AMF network element by invoking an information transfer (for example, Namf_Communication_N1N2MessageTransfer) service.

After receiving the first indication information from the SMF network element, the AMF network element responds to the first indication information, and performs step S511. For example, after receiving the first indication information used to indicate that the quantity of authentication failures of the first network slice is greater than or equal to the second threshold or used to indicate the authentication failure of the first network slice, the AMF network element determines to delete the S-NSSAI corresponding to the first network slice from the first Allowed NSSAI, to generate the second Allowed NSSAI, in other words, determines to perform step S511. Alternatively, after receiving the first indication information used to instruct the AMF network element to determine the second Allowed NSSAI, the AMF network element performs step S511 based on the first indication information. For step S511 and subsequent steps S512 to S514, refer to the descriptions of steps S309 to S312 in FIG. 3. Details are not described herein again.

Therefore, according to the method in this embodiment of the present invention, after receiving the first information (namely, the authentication result in FIG. 5A) used to indicate the authentication failure of the first network slice, the SMF network element records the quantity of authentication failures of the first network slice. When the SMF network element determines that the quantity of authentication failures of the first network slice is greater than or equal to a second threshold, the SMF network element sends the first indication information to the AMF network element. After receiving the first indication information, the AMF network element sends the second Allowed NSSAI to the terminal device. The second Allowed NSSAI does not include S-NSSAI corresponding to the first network slice. Therefore, when the quantity of authentication failures of the first network slice is less than the second threshold, the AMF network element does not immediately send the second Allowed NSSAI to the terminal device, but allows the terminal device to change the certificate used for authentication, and to attempt to re-initiate the PDU session corresponding to the first network slice. This increases a possibility that the authentication succeeds. When the quantity of authentication failures of the first network slice is greater than or equal to the second threshold, if the authentication still fails, the second Allowed NSSAI is sent to the terminal device, thereby avoiding network congestion caused by frequent access of the terminal device to the first network slice, and reducing signaling interworking between the terminal device and a network.

Figure 6:
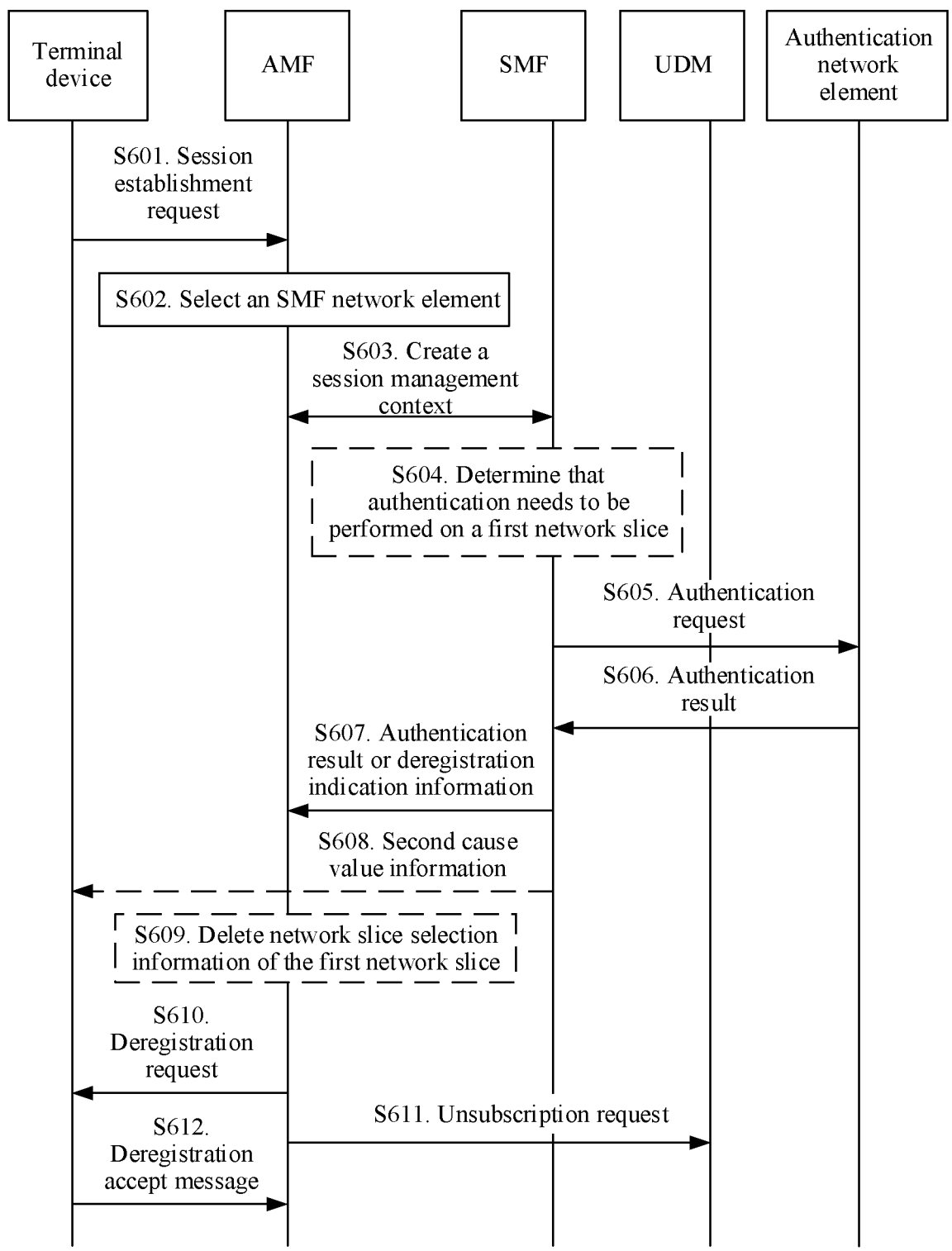
FIG. 6 is a flowchart of another network slice access control method according to an embodiment of this application.

FIG. 6 is a flowchart of another network slice access control method according to an embodiment of this application. The flowchart shown in FIG. 6 describes a method in the manner 2 of step S202 in FIG. 2: After receiving the first information associated with the authentication failure of the first network slice, the AMF network element sends the deregistration request to the terminal device. Therefore, network congestion caused by frequent access of the terminal device to the first network slice is avoided. FIG. 6 is described with reference to FIG. 3. As shown in FIG. 6, the method may include the following steps.

For steps S601 to S606, refer to the descriptions of steps S301 to S306 in FIG. 3. Details are not described herein again.

S607. The SMF network element sends the authentication result or deregistration indication information to the AMF network element. Correspondingly, the AMF network element receives the authentication result or the deregistration indication information from the SMF network element.

For example, the SMF network element sends, by invoking an information transfer (for example, Namf_Communication_N1N2MessageTransfer) service, the authentication result or the deregistration indication information to the AMF network element. The deregistration indication information is used to instruct the AMF network element to send a deregistration request to the terminal device.

In the example shown in FIG. 6, the second information that is associated with the authentication failure of the network slice (the first network slice) and that is received by the AMF network element from the SMF network element in FIG. 2 may be the authentication result of the first network slice in step S607 or the deregistration indication information in S607.

Optionally, the method further includes step S608. For step S608, refer to the description of step S308 in FIG. 3. Details are not described herein again.

Optionally, after step S607, the method may further include step S609. For step S609, refer to the description of step S310 in FIG. 3. Details are not described herein again.

The method shown in FIG. 6 further includes the following steps.

S610. The AMF network element sends a deregistration request to the terminal device. Correspondingly, the terminal device receives the deregistration request from the AMF network element.

For example, the deregistration request message is used to request the terminal device to deregister from a network.

For example, the AMF network element learns of the authentication failure of the first network slice based on the authentication result in step S607, and the AMF network element sends the deregistration request to the terminal device. Alternatively, the AMF network element sends the deregistration request to the terminal device based on the deregistration indication information in step S607.

Optionally, before the AMF network element sends the deregistration request to the terminal device, the AMF network element determines, based on local policy information or a quantity of pieces of S-NSSAI in Allowed NSSAI, to send the deregistration request. The Allowed NSSAI is obtained by the terminal device in a registration procedure.

In a possible implementation, the local policy information is: When the Allowed NSSAI includes a plurality of pieces of S-NSSAI, after authentication on one or more network slices corresponding to one or more pieces of S-NSSAI fails, the AMF network element sends the deregistration request to the terminal device. Alternatively, when the Allowed NSSAI includes only one piece of S-NSSAI, after authentication on a network slice corresponding to the unique S-NSSAI fails, the AMF network element sends the deregistration request to the terminal device.

For example, the local policy information is: When the Allowed NSSAI includes S-NSSAI-1 and S-NSSAI-2, after authentication on the first network slice corresponding to the S-NSSAI-1 fails, the AMF network element sends the deregistration request to the terminal device. Alternatively, when the Allowed NSSAI includes only S-NSSAI-1, after authentication on the first network slice corresponding to the S-NSSAI-1 fails, the AMF network element sends the deregistration request to the terminal device.

S611. The AMF network element sends an unsubscription request to a UDM network element. Correspondingly, the UDM network element receives the unsubscription request from the AMF network element.

For example, the unsubscription request is used to request the UDM network element to delete identification information of the AMF network element. Then, if subscription information of the terminal device is modified, the UDM network element does not need to notify the AMF network element again.

For example, the AMF network element sends the unsubscription request to the UDM network element by invoking an unsubscription (Nudm_SDM_Unsubscribe) service.

S612. The terminal device sends a deregistration accept message to the AMF network element. Correspondingly, the AMF network element receives the deregistration accept message from the terminal device.

For example, the deregistration accept message is used to confirm with the AMF network element that the terminal device accepts the deregistration request.

Therefore, according to the method in this embodiment of the present invention, after receiving first information (namely, the authentication result or the deregistration indication information in FIG. 6) associated with the authentication failure of the first network slice, the AMF network element sends the deregistration request to the terminal device. Before re-initiating a session establishment procedure corresponding to the first network slice, the terminal device first initiates the registration procedure, so that the terminal device is prevented from frequently initiating the session establishment request, to avoid network congestion caused by frequent access of the terminal device to the network slice, and reduce signaling interworking between the terminal device and the network. In addition, according to the method shown in FIG. 6, after the authentication on the first network slice fails, access of the terminal device to the network is rejected, so that the terminal device can be prevented from maliciously (for example, the terminal device suffers virus intrusion) attacking the network, thereby enhancing network security.

Figure 7A:
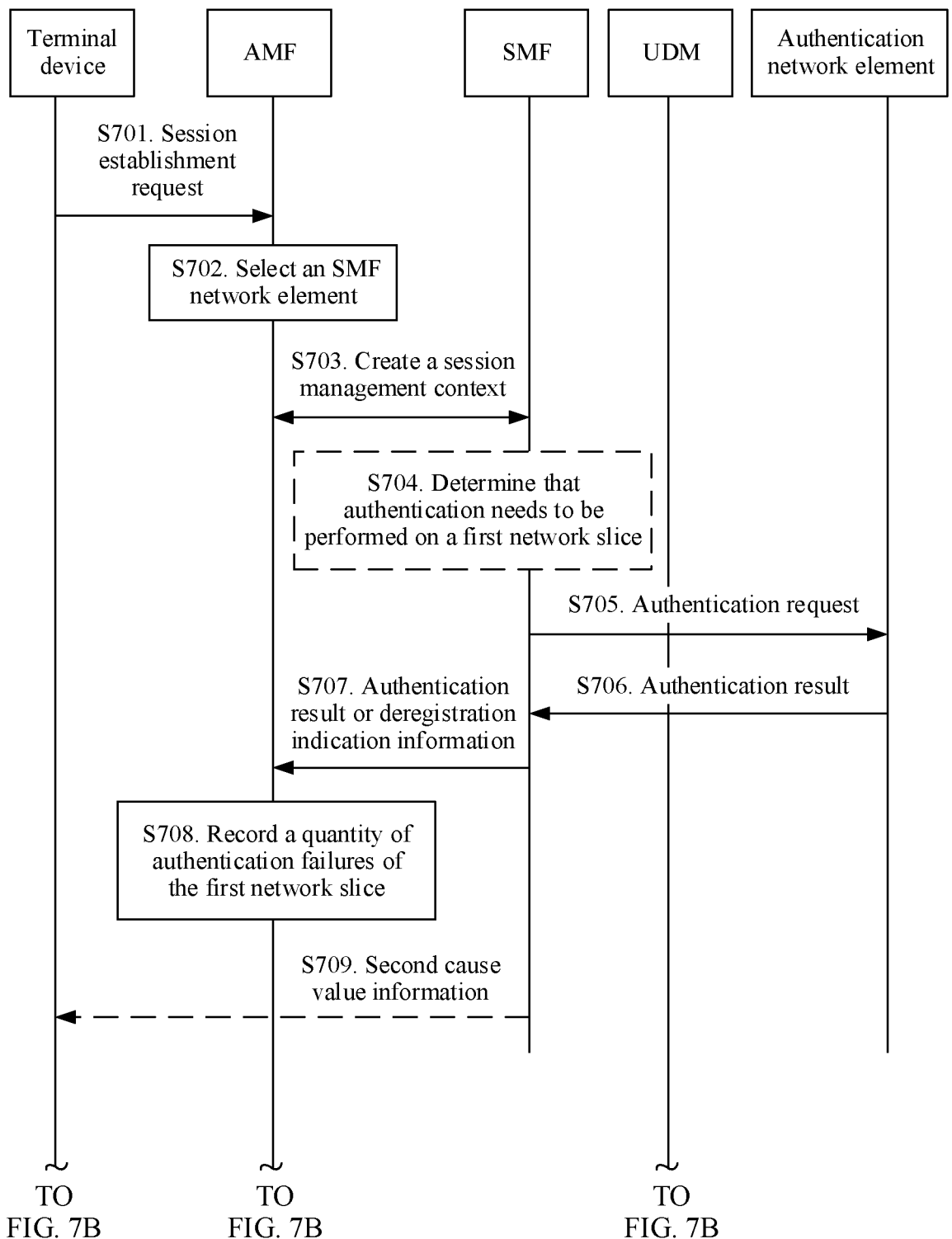
FIG. 7A and FIG. 7B are a flowchart of another network slice access control method according to an embodiment of this application.
Figure 7B:
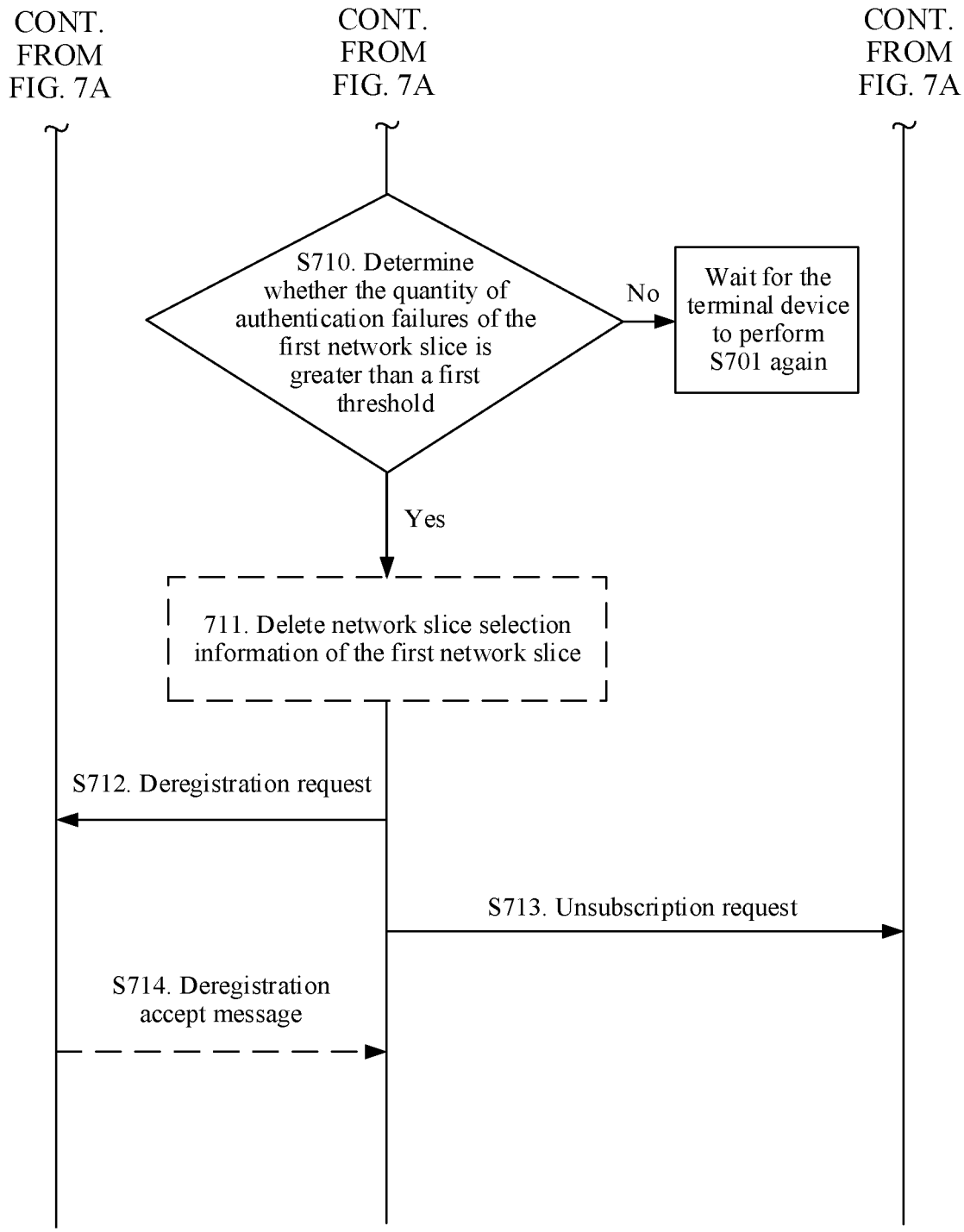

FIG. 7A and FIG. 7B are a flowchart of another network slice access control method according to an embodiment of this application. The flowchart shown in FIG. 7A and FIG. 7B describes the method in the manner 2 of step S202 in FIG. 2. A difference between FIGS. 7A and 7B and FIG. 6 lies in that: FIG. 7A and FIG. 7B are based on the method shown in FIG. 6, and before the AMF network element sends the deregistration request to the terminal device, the AMF network element determines that a quantity of authentication failures of the first network slice is greater than or equal to a first threshold. FIG. 7A and FIG. 7B are described with reference to FIG. 4A, FIG. 4B, and FIG. 6. As shown in FIG. 7A and FIG. 7B, the method may include the following steps.

For steps S701 to S709, refer to the descriptions of steps S401 to S409 in FIG. 4A. Details are not described herein again.

S710. The AMF network element determines whether the quantity of authentication failures of the first network slice is greater than or equal to the first threshold.

For example, the AMF network element locally stores the first threshold, and the first threshold is a positive integer.

For example, when determining that the quantity of authentication failures of the first network slice is less than the first threshold, the AMF network element waits for the terminal device to re-initiate a session establishment request, in other words, waits for the terminal device to perform S701 again. For example, when the terminal device performs step S701 again, the terminal device may change the certificate used for authentication, and re-initiate a PDU session establishment procedure corresponding to the first network slice. When the AMF network element determines that the quantity of authentication failures of the first network slice is greater than the first threshold, the method shown in FIG. 7A and FIG. 7B further includes steps S711 to S714. For steps S711 to S714, refer to the descriptions of steps S609 to S612 in FIG. 6. Details are not described herein again. When determining that the quantity of authentication failures of the first network slice is equal to the first threshold, the AMF network element may wait for the terminal device to perform step S701 again, or perform steps S711 to S714. This may be determined based on an actual situation or configuration, and is not limited in this application.

Therefore, according to the method in this embodiment of the present invention, after receiving the first information (namely, the authentication result or the deregistration indication information in FIG. 7A) associated with the authentication failure of the first network slice, the AMF network element records the quantity of authentication failures of the first network slice. When determining that the quantity of authentication failures of the first network slice is greater than or equal to the first threshold, the AMF network element sends the deregistration request to the terminal device. Therefore, when the quantity of authentication failures of the first network slice is less than the first threshold, the AMF network element does not immediately send the deregistration request to the terminal device, but allows the terminal device to change the certificate used for authentication, and to attempt to re-initiate a PDU session corresponding to the first network slice. This increases a possibility that the authentication succeeds. When the quantity of authentication failures of the first network slice is greater than or equal to the first threshold, if the authentication still fails, the deregistration request is sent to the terminal device. Before re-initiating a session establishment procedure corresponding to the first network slice, the terminal device first initiates the registration procedure, so that the terminal device is prevented from frequently initiating the session establishment request, to avoid network congestion caused by frequent access of the terminal device to the network slice, and reduce signaling interworking between the terminal device and the network.

Figure 8A:
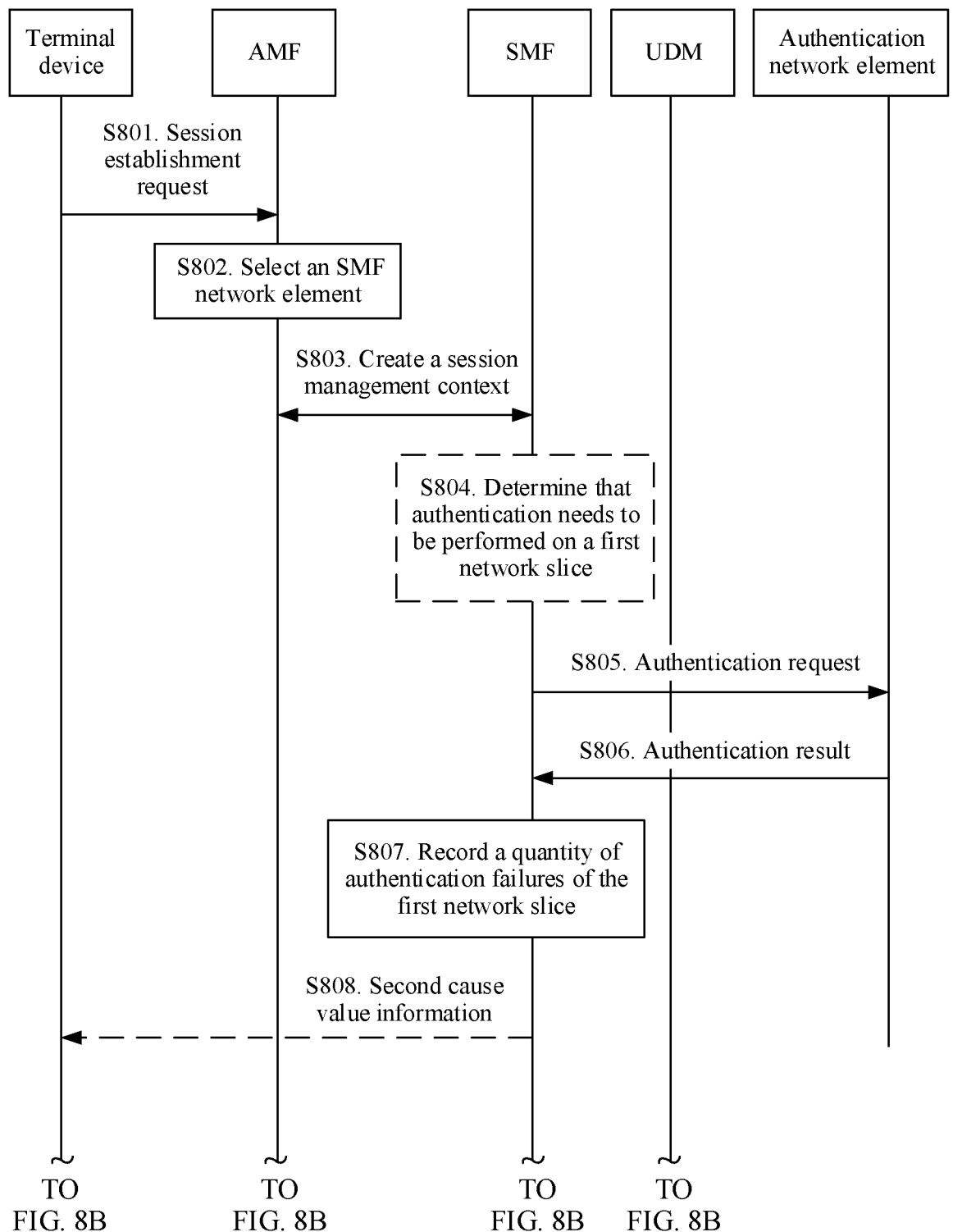
FIG. 8A and FIG. 8B are a flowchart of another network slice access control method according to an embodiment of this application.
Figure 8B:
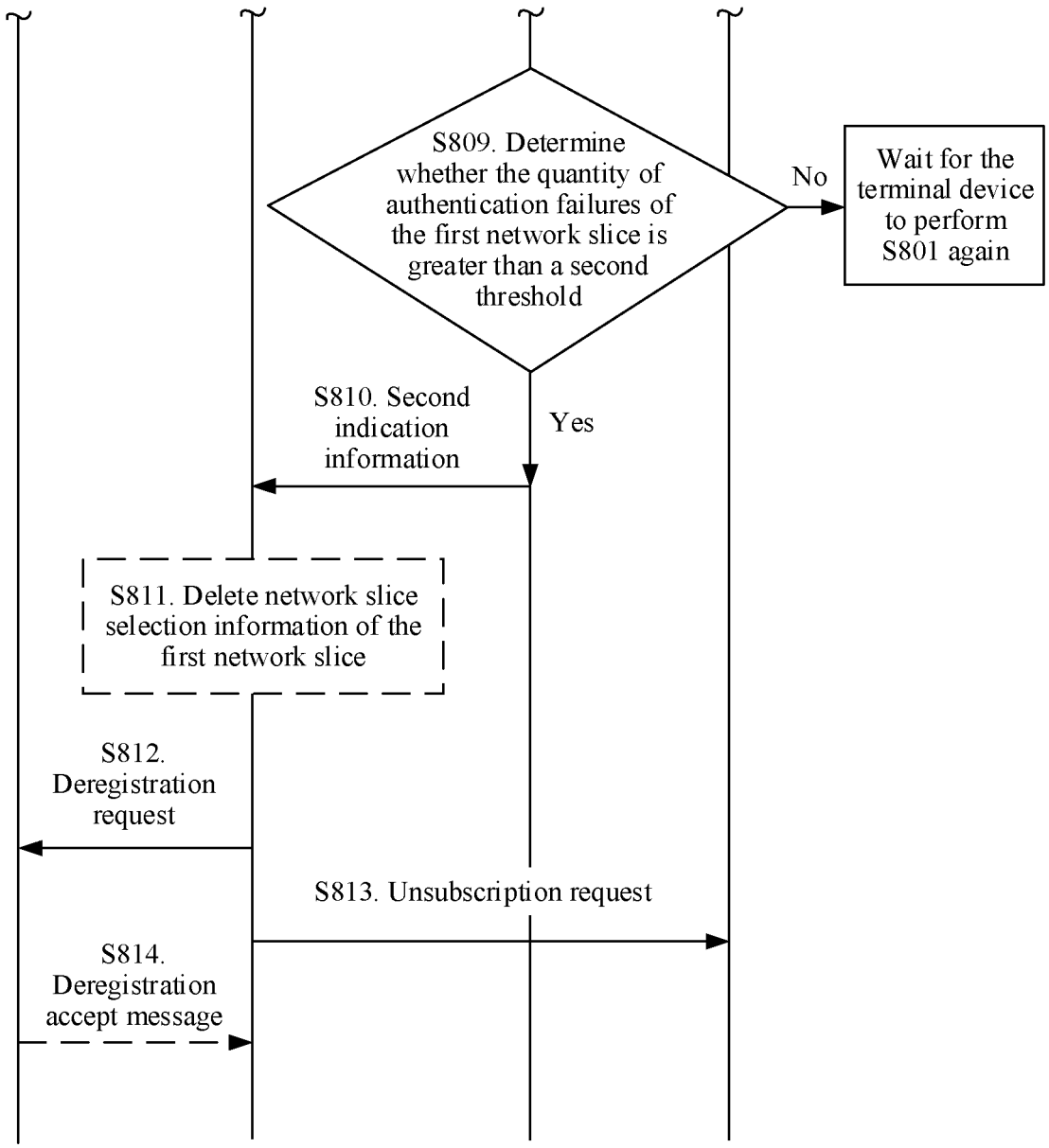

FIG. 8A and FIG. 8B are a flowchart of another network slice access control method according to an embodiment of this application. The flowchart shown in FIG. 8A and FIG. 8B describes the method in the manner 2 of step S202 in FIG. 2. A difference between FIG. 8A and FIG. 7A lies in that: In FIG. 7A, before the AMF network element sends the deregistration request to the terminal device, the AMF network element determines that the quantity of authentication failures of the first network slice is greater than or equal to the first threshold; in FIG. 8A, before an AMF network element sends a deregistration request to a terminal device, an SMF network element determines that a quantity of authentication failures of a first network slice is greater than or equal to a second threshold, and instructs the AMF network element to send the deregistration request to the terminal device. FIG. 8A and FIG. 8B are described with reference to FIG. 5A, FIG. 5B, and FIG. 6. As shown in FIG. 8A and FIG. 8B, the method may include the following steps.

For steps S801 to S808, refer to the descriptions of steps S501 to S508 in FIG. 5A. Details are not described herein again.

S809. The SMF network element determines whether the quantity of authentication failures of the first network slice is greater than or equal to a second threshold.

For example, the SMF network element locally stores the second threshold, and the second threshold is a positive integer.

For example, when determining that the quantity of authentication failures of the first network slice is less than the second threshold, the SMF network element waits for the terminal device to re-initiate a session establishment request, in other words, waits for the terminal device to perform S801 again. For example, when the terminal device performs step S801 again, the terminal device may change the certificate used for authentication, and re-initiate a PDU session establishment procedure corresponding to the first network slice. When the SMF network element determines that the quantity of authentication failures of the first network slice is greater than the second threshold, the method shown in FIG. 8 further includes steps S810 to S814. When determining that the quantity of authentication failures of the first network slice is equal to the second threshold, the SMF network element may wait for the terminal device to perform step 801 again, or perform steps S810 to S814. This may be determined based on an actual situation or configuration, and is not limited in this application.

S810. The SMF network element sends second indication information to the AMF network element. Correspondingly, the AMF network element receives the second indication information from the SMF network element.

For example, the second indication information is used to indicate that the quantity of authentication failures of the first network slice is greater than or equal to the second threshold; or the second indication information is used to instruct the AMF network element to send the deregistration request to the terminal device; or the second indication information is used to indicate the authentication failure of the first network slice.

In other words, the first information received by the AMF network element from the SMF network element in step S202 in FIG. 2 is the second indication information. The first information is used to indicate that the quantity of authentication failures of the first network slice is greater than or equal to the second threshold; or the first information is used to instruct the AMF network element to send the deregistration request to the terminal device; or the first information is used to indicate the authentication failure of the first network slice.

For example, the SMF sends the second indication information to the AMF network element by invoking an information transfer (for example, Namf_Communication_N1N2MessageTransfer) service.

After receiving the second indication information from the SMF network element, the AMF network element responds to the second indication information, and performs step S811. For example, after receiving the second indication information used to indicate that the quantity of authentication failures of the first network slice is greater than or equal to the second threshold or used to indicate the authentication failure of the first network slice, the AMF network element determines to send the deregistration request to the terminal device, in other words, determines to perform step S811. Alternatively, after receiving the second indication information used to instruct the AMF network element to send the deregistration request to the terminal device, the AMF network element performs step S811 based on the second indication information. For step S811 and subsequent steps S812 to S814, refer to the descriptions of steps S609 to S612 in FIG. 6. Details are not described herein again.

Therefore, according to the method in this embodiment of the present invention, after receiving the first information (namely, the authentication result in FIG. 8A) used to indicate the authentication failure of the first network slice, the SMF network element records the quantity of authentication failures of the first network slice. When the SMF network element determines that the quantity of authentication failures of the first network slice is greater than or equal to the first threshold, the SMF network element sends the second indication information to the AMF network element, and the AMF network element sends the deregistration request to the terminal device based on the second indication information. Therefore, when the quantity of authentication failures of the first network slice is less than the first threshold, the AMF network element does not immediately send the deregistration request to the terminal device, but allows the terminal device to change the certificate used for authentication, and to attempt to re-initiate a PDU session corresponding to the first network slice. This increases a possibility that the authentication succeeds. When the quantity of authentication failures of the first network slice is greater than or equal to the first threshold, if the authentication still fails, the deregistration request is sent to the terminal device. Before re-initiating a session establishment procedure corresponding to the first network slice, the terminal device first initiates the registration procedure, so that the terminal device is prevented from frequently initiating the session establishment request, to avoid network congestion caused by frequent access of the terminal device to the network slice, and reduce signaling interworking between the terminal device and the network.

With reference to the descriptions of FIG. 3 to FIG. 8B, the present invention discloses a network slice access control method that is as follows: A session management function network element (an SMF network element) receives first information (an authentication result) from an authentication network element. The first information is used to indicate an authentication failure of a network slice (for example, a first network slice). The session management function network element sends second information to an access and mobility management function network element (an AMF network element) based on the first information. The second information is associated with the authentication failure of the network slice. The second information (for example, the authentication result in FIG. 3, FIG. 4A, FIG. 6, or FIG. 7A, or the first indication information in FIG. 5B, or the second indication information in FIG. 8B) is used to indicate the authentication failure of the network slice. Alternatively, the second information (for example, the first indication information in FIG. 5B or the second indication information in FIG. 8B) is used to indicate that a quantity of authentication failures of the network slice is greater than or equal to a first threshold. Alternatively, the second information (for example, the update indication information in FIG. 3 or the first indication information in FIG. 5A) is used to instruct the access and mobility management function network element to delete single network slice selection assistance information corresponding to the network slice from first allowed network slice selection assistance information, to generate second allowed network slice selection assistance information. Alternatively, the second information (for example, the deregistration indication information in FIG. 6 or the second indication information in FIG. 8) is used to instruct the access and mobility management function network element to request the terminal device to perform deregistration.

Figure 9:
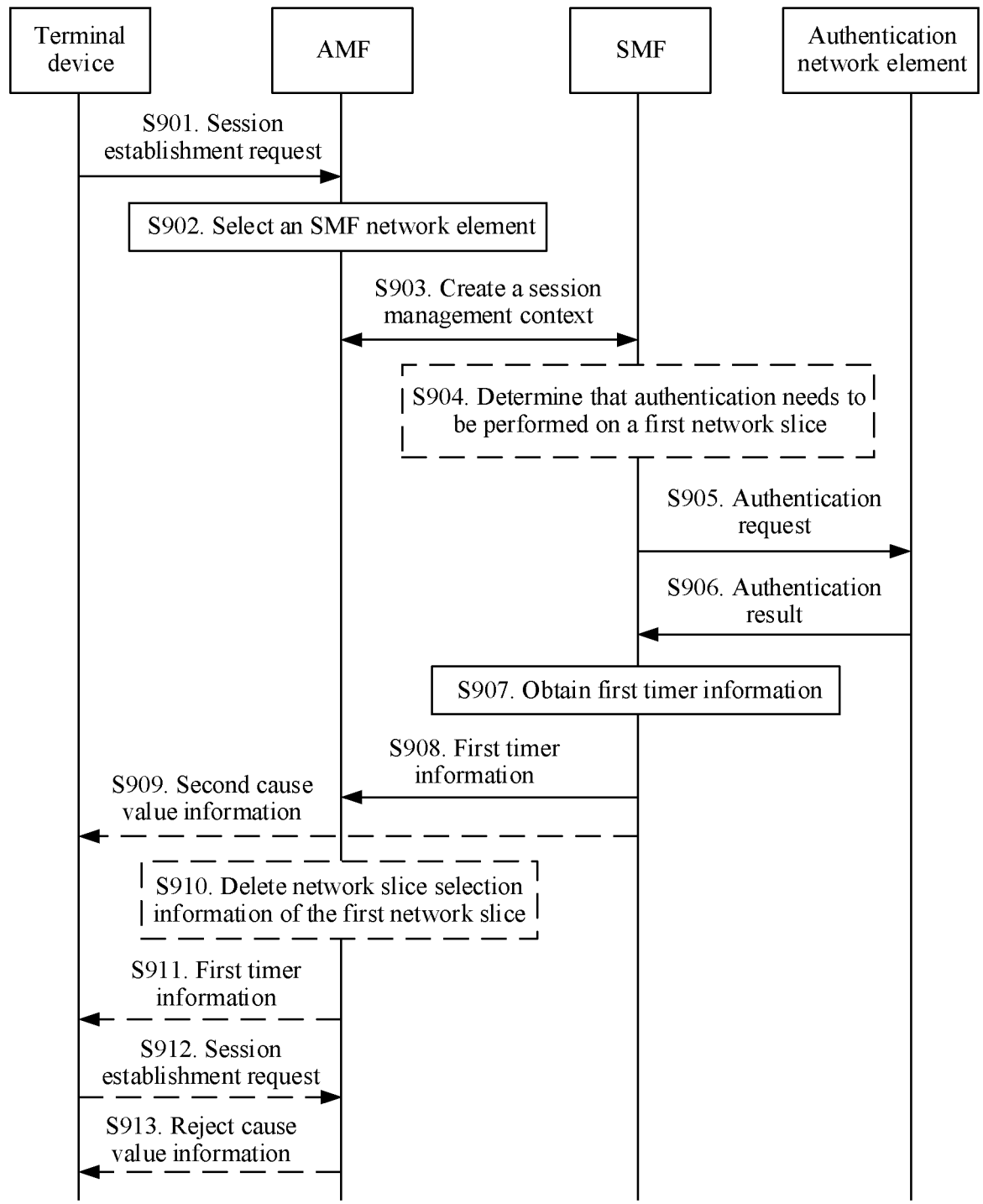
FIG. 9 is a flowchart of another network slice access control method according to an embodiment of this application.

FIG. 9 is a flowchart of another network slice access control method according to an embodiment of this application. The flowchart shown in FIG. 9 describes the following method: After receiving first information used to indicate an authentication failure of a first network slice, an SMF network element sends first timer information to an AMF network element. Before a first timer expires, the AMF network element rejects performing access of a terminal device to the first network slice again, to avoid network congestion caused by frequent access of the terminal device to the first network slice. FIG. 9 is described with reference to FIG. 3 and FIG. 8B. As shown in FIG. 9, the method may include the following steps.

For steps S901 to S906, refer to the descriptions of steps S301 to S306 in FIG. 3. Details are not described herein again.

The method shown in FIG. 9 further includes the following steps.

S907. The SMF network element obtains the first timer information.

For example, the first timer information is used to instruct to reject access of the terminal device to the first network slice before the first timer expires.

For example, the SMF network element may obtain the first timer information in either of the following two manners.

Manner a: The SMF network element receives the first timer information from the authentication network element.

For example, the SMF network element receives the first timer information from the authentication network element by using an authentication response message.

Manner b: The SMF network element determines the first timer information based on local configuration information of the SMF network element.

In the manner b, optionally, with reference to the descriptions in step S807 and step S809 in FIG. 8B, when the SMF network element determines that a quantity of authentication failures of the first network slice is greater than or equal to a second threshold, the SMF determines the first timer information.

S908. The SMF network element sends the first timer information to the AMF network element. Correspondingly, the AMF network element receives the first timer information from the SMF network element.

For example, the SMF network element sends, by invoking an information transfer (for example, Namf_Communication_N1N2MessageTransfer) service, the first timer information obtained by SMF network element in step S907 to the AMF network element.

In other words, in the example shown in FIG. 9, the second information that is associated with the authentication failure of the network slice (the first network slice) and that is received by the AMF network element from the SMF network element in FIG. 2 may be the first timer information in step S908.

Optionally, before the SMF network element sends the first timer information to the AMF network element, referring to the descriptions in step S807 and step S809 in FIG. 8B, the SMF network element determines that the quantity of authentication failures of the first network slice is greater than or equal to the second threshold.

Therefore, according to the method in this embodiment of the present invention, after receiving the first information (namely, the authentication result in FIG. 9) used to indicate the authentication failure of the first network slice, the SMF network element sends the first timer information to the AMF network element. Before the first timer expires, the AMF network element rejects performing access of the terminal device to the first network slice again, to avoid network congestion caused by frequent access of the terminal device to the first network slice, and reduce signaling interworking between the terminal device and a network.

Optionally, this embodiment further includes steps S911 to S913.

S911. The AMF network element sends the first timer information to the terminal device. Correspondingly, the terminal device receives the first timer information from the AMF network element.

For example, the AMF network element sends the first timer information to the terminal device by using a PDU session establishment reject message.

It should be noted that, in a normal case, the terminal device is disallowed, based on the first timer information, to re-initiate a session establishment procedure corresponding to the first network slice before the first timer expires. In an abnormal case, the session establishment procedure corresponding to the first network slice is re-initiated before the first timer expires. This embodiment further includes steps S912 and S913.

For step S912, refer to the description of step S901. Details are not described herein again.

S913. The AMF network element sends reject cause value information to the terminal device. Correspondingly, the terminal device receives the reject cause value information from the AMF network element.

For example, the reject cause value information is used to indicate that a cause for rejecting the session establishment request message of the terminal device by the AMF network element is that: Access of the terminal device to the first network slice is rejected before the first timer expires, or the first timer does not expire.

Therefore, the terminal device may learn of the first timer information, and is disallowed to re-initiate a PDU session request corresponding to the first network slice before the first timer expires. Even if the terminal device re-initiates the PDU session request corresponding to the first network slice before the first timer expires in an abnormal case, the AMF network element may reject access of the terminal device to the first network slice.

Optionally, after step S908, the method may further include step S909. For step S909, refer to the description of step S308 in FIG. 3. Details are not described herein again.

Optionally, after step S908, the method may further include step S910. For step S910, refer to the description of step S310 in FIG. 3. Details are not described herein again.

Figure 10:
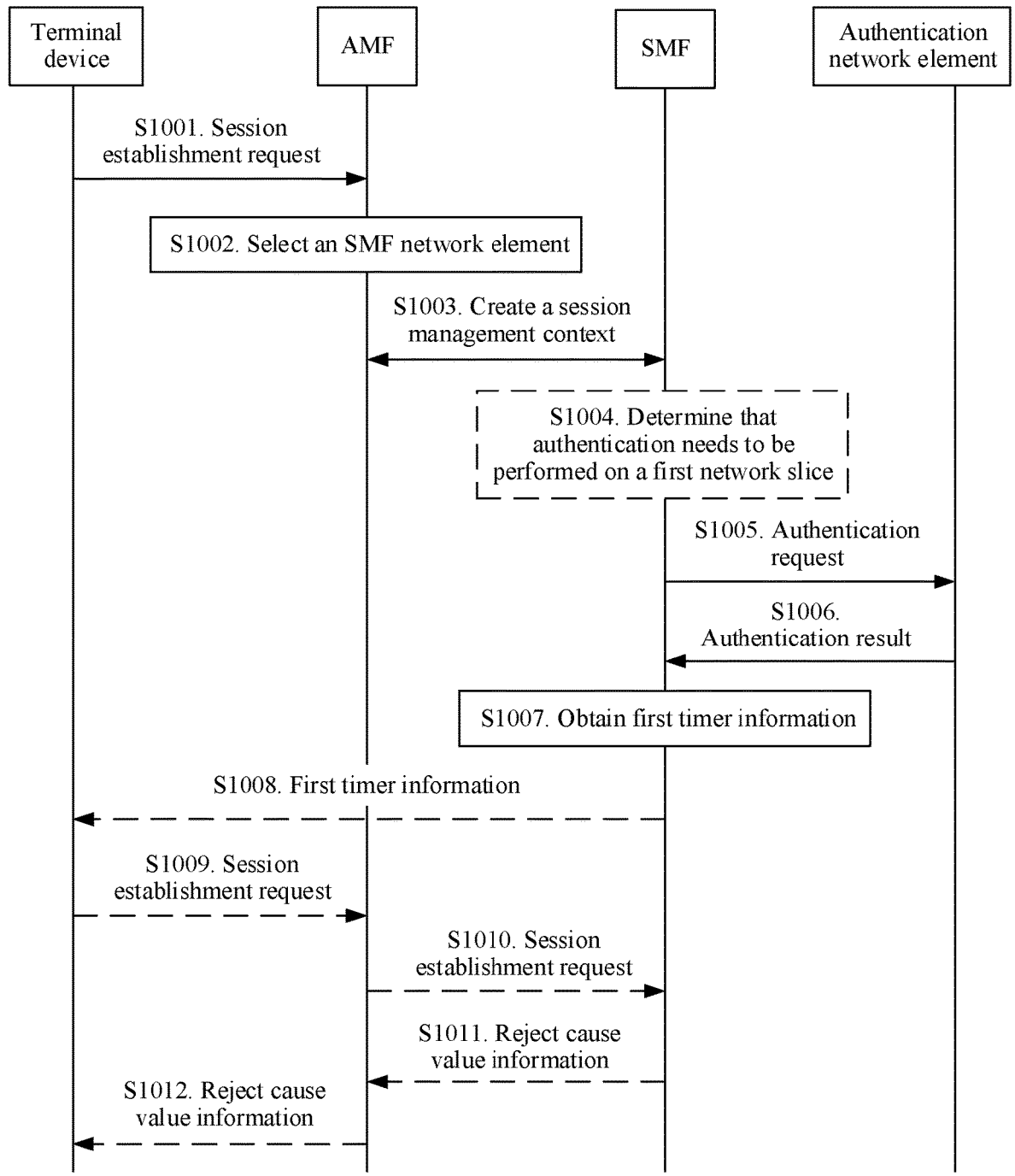
FIG. 10 is a flowchart of another network slice access control method according to an embodiment of this application.

FIG. 10 is a flowchart of another network slice access control method according to an embodiment of this application. A difference between FIG. 10 and FIG. 9 lies in that: In FIG. 9, after the AMF network element receives the first timer information from the SMF network element and before the first timer expires, the AMF network element rejects access of the terminal device to the network slice; in FIG. 10, before the first timer expires, the SMF network element rejects access of the terminal device to the network slice. FIG. 10 is described with reference to FIG. 9. As shown in FIG. 10, the method may include the following steps.

For steps S1001 to S1007, refer to the descriptions of steps S901 to S907 in FIG. 9. Details are not described herein again.

With reference to the descriptions of steps S1001 to S1007, the present invention discloses a network slice access control method that is as follows: A session management function network element (an SMF network element) receives first information (an authentication result) from an authentication network element. The first information is used to indicate an authentication failure of a network slice (a first network slice). The session management function network element obtains timer information (first timer information). Before a timer (a first timer) expires, the session management function network element rejects access of a terminal device to the network slice. Therefore, according to the method in this embodiment of the present invention, the SMF network element obtains first timer information after receiving the first information (namely, the authentication result in FIG. 10) used to indicate the authentication failure of the first network slice, and before a first timer expires, rejects performing access of the terminal device to the first network slice again, thereby avoiding network congestion caused by frequent access of the terminal device to the first network slice, and reducing signaling interworking between the terminal device and a network.

Optionally, the method shown in FIG. 10 further includes steps S1008 to S1012.

S1008. The SMF network element sends the first timer information to the terminal device. Correspondingly, the terminal device receives the first timer information from the SMF network element.

For example, the SMF network element sends the first timer information to the terminal device by invoking an information transfer (for example, Namf_Communication_N1N2MessageTransfer) service and by using a PDU session establishment reject message.

Optionally, the SMF network element further sends second cause value information to the terminal device by invoking the information transfer service and by using the PDU session establishment reject message. For example, the second cause value information is used to indicate the authentication failure of the first network slice, or the second cause value information is used to indicate a cause of the authentication failure of the first network slice. Optionally, the second cause value information is used to indicate that the cause of the authentication failure of the first network slice is: The certificate used to perform authentication on the first network slice is incorrect or invalid. With reference to the description of S1008, the terminal device obtains the first information (the first timer information). The first information is used to instruct to reject access of the terminal device to the network slice (the first network slice) before the timer (the first timer information) expires. The terminal device is disallowed access to the network slice based on the first information.

With reference to the description of S1008, the network slice access control method disclosed in the present invention further includes: The session management function network element sends second information (for example, the second cause value information) to the terminal device. The second information is used to indicate the authentication failure of the network slice, or the second information is used to indicate the cause of the authentication failure of the network slice.

It should be noted that, in a normal case, the terminal device is disallowed, based on the first timer information, to re-initiate a session establishment procedure corresponding to the first network slice before the first timer expires. In an abnormal case, the session establishment procedure corresponding to the first network slice is re-initiated before the first timer expires. This embodiment further includes steps S1009 and S1010.

For step S1009, refer to the description of step S1001. Details are not described herein again.

S1010: The AMF network element sends a session establishment request to the SMF network element. Correspondingly, the SMF network element receives the session establishment request from the AMF network element.

S1011. The SMF network element sends reject cause value information to the AMF network element. Correspondingly, the AMF network element receives the reject cause value information from the SMF network element.

For example, the reject cause value information is used to indicate that a cause for rejecting the session establishment request message of the terminal device by the SMF network element is that: Access of the terminal device to the first network slice is rejected before the first timer expires, or the first timer does not expire.

For example, the SMF network element sends the reject cause value information to the AMF network element by invoking an information transfer (for example, Namf_Communication_N1N2MessageTransfer) service and by using a PDU session establishment reject message.

S1012. The AMF network element sends the reject cause value information to the terminal device. Correspondingly, the terminal device receives the reject cause value information from the AMF network element.

For example, the AMF network element sends the reject cause value information to the terminal device by using a PDU session establishment reject message.

Therefore, the terminal device may learn of the first timer information, and is disallowed to re-initiate a PDU session request corresponding to the first network slice before the first timer expires. Even if the terminal device re-initiates the PDU session request corresponding to the first network slice before the first timer expires in an abnormal case, the SMF network element may reject access of the terminal device to the first network slice. Therefore, network congestion caused by frequent access of the terminal device to the first network slice is avoided, and signaling interworking between the terminal device and a network is reduced.

Figure 11:
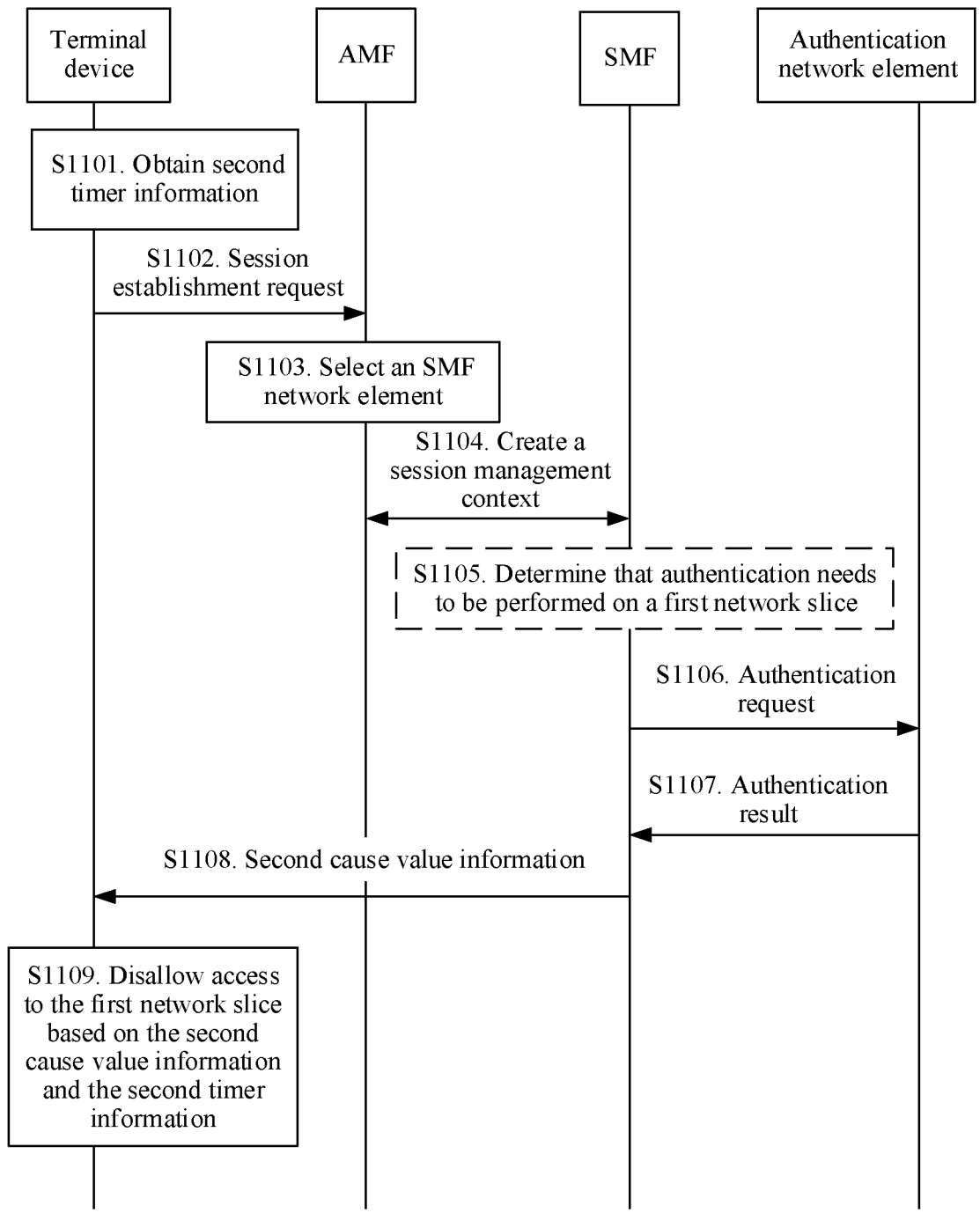
FIG. 11 is a flowchart of another network slice access control method according to an embodiment of this application.

FIG. 11 is a flowchart of another network slice access control method according to an embodiment of this application. A difference between FIG. 11 and FIGS. 9 and 10 lies in that: In FIG. 9 and FIG. 10, after receiving the first information (namely, the authentication result in FIG. 9 and FIG. 10) used to indicate the authentication failure of the first network slice, the SMF network element obtains the first timer information, and sends the first timer information to the terminal device, to instruct that the terminal device is disallowed access to the first network slice before the first timer expires; in FIG. 11, a terminal device determines second timer information, and is disallowed access to a first network slice before a second timer expires. FIG. 11 is described with reference to FIG. 9. As shown in FIG. 11, the method may include the following steps.

S1101. The terminal device obtains the second timer information.

For example, the terminal device may obtain the second timer information in either of the following two manners.

Manner i: The terminal device stores information about a timer of an authentication failure corresponding to each piece of S-NSSAI in network slice information, and the network slice information includes configured NSSAI (configured NSSAI). The configured NSSAI is used to indicate that before the timer expires, the terminal device cannot access a network slice identified by the S-NSSAI corresponding to the timer. As shown in Table 1, information about timers of authentication failures corresponding to two network slices is configured in the terminal device. A timer of an authentication failure corresponding to a first network slice identified by S-NSSAI-1 is a 30 seconds timer, and a timer of an authentication failure corresponding to a first network slice identified by S-NSSAI-2 is a 60 seconds timer.

TABLE 1

Information about a timer of an authentication failure corresponding to the S-NSSAI in the network slice information

| Network slice identification information | Timer |
| --- | --- |
| S-NSSAI-1 | 30 seconds |
| S-NSSAI-2 | 60 seconds |

Manner ii: The terminal device receives, from the AMF network element in a registration procedure, information about a timer of an authentication failure corresponding to each piece of S-NSSAI in Allowed NSSAI, to indicate that before the timer expires, the terminal device cannot access a network slice identified by the S-NSSAI corresponding to the timer. As shown in Table 2, the Allowed NSSAI includes two pieces of S-NSSAI, a timer of an authentication failure corresponding to a third network slice identified by S-NSSAI-3 is a 20 seconds timer, and a timer of an authentication failure corresponding to a fourth network slice identified by S-NSSAI-4 is a 40 seconds timer.

TABLE 2

Information about a timer of an authentication failure corresponding to the S-NSSAI in the Allowed NSSAI for the terminal device

| Network slice identification information | Timer |
| --- | --- |
| S-NSSAI-3 | 20 seconds |
| S-NSSAI-4 | 40 seconds |

For steps S1102 to S1107, refer to the descriptions of steps S901 to S906 in FIG. 9. Details are not described herein again.

The method shown in FIG. 11 further includes the following steps.

S1108. The SMF network element sends second cause value information to the terminal device. Correspondingly, the terminal device receives the second cause value information from the SMF network element.

For example, the SMF network element sends the second cause value information to the terminal device by invoking an information transfer (for example, Namf_Communication_N1N2MessageTransfer) service and by using a PDU session establishment reject message.

For example, the second cause value information is used to indicate the authentication failure of the first network slice, or the second cause value information is used to indicate a cause of the authentication failure of the first network slice. Optionally, the second cause value information is used to indicate that the cause of the authentication failure of the first network slice is: A certificate used to perform authentication on the first network slice is incorrect or invalid.

S1109. The terminal device is disallowed access to the first network slice based on the second cause value information and the second timer information.

For example, the terminal device learns of the authentication failure of the first network slice based on the authentication result in step S1108, and determines, based on the second timer information obtained in step S1101, the second timer information corresponding to the first network slice. The terminal device starts a second timer. As shown in Table 1, if the timer of the authentication failure corresponding to the first network slice identified by the S-NSSAI-1 is a 30 seconds timer, the second timer is a 30 seconds timer. Before the second timer expires, the terminal device is disallowed to initiate a PDU session establishment procedure corresponding to the first network slice.

Therefore, according to the method in this embodiment of the present invention, after receiving the first information (namely, the authentication result in FIG. 11) used to indicate the authentication failure of the first network slice, the SMF network element sends the second cause value information to the terminal device. The terminal device is disallowed, based on the second cause value information and the second timer information, performing access to the first network slice again before the second timer expires. Therefore, network congestion caused by frequent access of the terminal device to the first network slice is avoided, and signaling interworking between the terminal device and a network is reduced.

With reference to the foregoing descriptions of FIG. 3 to FIG. 11, the present invention discloses a following network slice access control method that is as follows: A terminal device obtains first information. The terminal device is disallowed access to a network slice (for example, a first network slice) based on the first information. In a first manner, the terminal device obtains the first information from the terminal device. The first information includes second timer information (for example, the second timer information in FIG. 11). The terminal device receives second information (for example, the second cause value information in FIG. 11) from a session management function network element (an SMF network element). The second information is used to indicate an authentication failure of a network slice (for example, the first network slice in FIG. 11), or the second information is used to indicate a cause of an authentication failure of a network slice. The terminal device responds to the second information, and is disallowed access to the network slice before a second timer (for example, the second timer in FIG. 11) expires. In a second manner, the terminal device receives first information from a session management function network element. The first information includes first timer information (for example, the first timer information in FIG. 9 or FIG. 10), and the first information is used to instruct to reject access of the terminal device to a network slice before a first timer expires. In a third manner, the terminal device receives first information from an access and mobility management function network element (an AMF network element). The first information is second Allowed NSSAI (for example, the second Allowed NSSAI in FIG. 3 to FIG. 5B) generated by the access and mobility management function network element after deleting S-NSSAI corresponding to a network slice from first Allowed NSSAI. Alternatively, the first information (for example, the deregistration request in FIG. 6 to FIG. 8B) is used to request the terminal device to perform deregistration.

For the foregoing second and third manners, the method further includes: The terminal device receives second information (for example, the second cause value information in FIG. 3 to FIG. 10) from the session management function network element. The second information is used to indicate an authentication failure of the network slice, or the second information is used to indicate a cause of an authentication failure of the network slice.

In the foregoing embodiments provided in this application, the solutions of the communication method provided in the embodiments of this application are separately described from a perspective of the network elements and from a perspective of interaction between the network elements. It may be understood that, to implement the foregoing functions, the network elements and the devices, for example, the radio access network device, the access and mobility management function network element, the terminal device, and the data management function network element, include corresponding hardware structures and/or software modules for performing the functions. A person skilled in the art should easily be aware that, in combination with the units and algorithm steps in the examples described in the embodiments disclosed in this specification, this application may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12A:
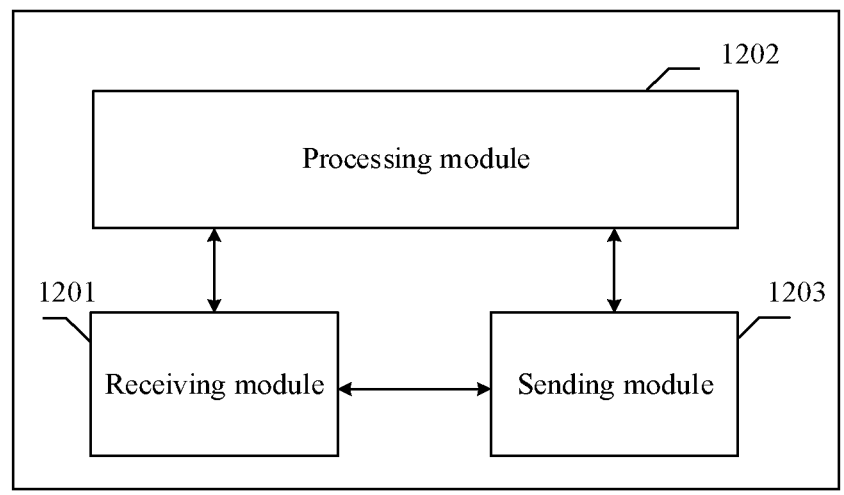
FIGS. 12A and 12B are schematic diagrams of a network slice-based apparatus/terminal device according to an embodiment of this application.

For example, when the foregoing network element implements a corresponding function by using a software module, a network slice access control apparatus may include a receiving module 1201, a processing module 1202, and a sending module 1203, as shown in FIG. 12A.

In an embodiment, the network slice access control apparatus may be configured to perform an operation of the AMF network element in FIG. 3 to FIG. 8B. An example is as follows.

The receiving module 1201 is configured to receive first information from a session management function network element (for example, an SMF network element). The first information is associated with an authentication failure of a network slice. The sending module 1203 is configured to send second information to a terminal device based on the first information. The second information is used to reject access of the terminal device to the network slice.

Therefore, in this embodiment of the present invention, the access and mobility management function network element may receive the first information associated with the authentication failure of the network slice, and then send the second information to the terminal device, to reject access of the terminal device to the network slice whose authentication fails, thereby avoiding network congestion caused by frequent access of the terminal device to the network slice whose authentication fails, and reducing signaling interworking between the terminal device and a network.

Optionally, the processing module 1202 is configured to delete single network slice selection assistance information (for example, S-NSSAI) corresponding to the network slice from first allowed network slice selection assistance information (for example, first Allowed NSSAI), to generate second allowed network slice selection assistance information (for example, second Allowed NSSAI). The sending module 1203 is configured to send the second allowed network slice selection assistance information to the terminal device.

Optionally, the first information is used to indicate the authentication failure of the network slice; or the first information is used to indicate that a quantity of authentication failures of the network slice is greater than or equal to a first threshold; or the first information is used to instruct the access and mobility management function network element to delete the single network slice selection assistance information corresponding to the network slice from the first allowed network slice selection assistance information, to generate the second allowed network slice selection assistance information.

Optionally, the second information is used to request the terminal device to perform deregistration.

Optionally, the first information is used to indicate the authentication failure of the network slice; or the first information is used to indicate that a quantity of authentication failures of the network slice is greater than or equal to a first threshold; or the first information is used to instruct the access and mobility management function network element to request the terminal device to perform deregistration.

Optionally, the processing module 1202 is configured to determine that a quantity of authentication failures is greater than or equal to a second threshold.

Optionally, the processing module 1202 is configured to delete network slice selection information of the network slice. The network slice selection information includes at least one of a network slice instance identifier of the network slice or an NRF network element identifier.

In addition, the receiving module 1201, the processing module 1202, and the sending module 1203 in the network slice access control apparatus may further implement another operation or function of the AMF network element in FIG. 3 to FIG. 8B. Details are not described herein again.

In another embodiment, the network slice access control apparatus shown in FIG. 12A may further be configured to perform an operation of the SMF network element in FIG. 3 to FIG. 9. An example is as follows.

The receiving module 1201 is configured to receive first information. The first information is used to indicate an authentication failure of a network slice. The sending module 1203 is configured to send second information to an access and mobility management function network element (for example, an AMF network element) based on the first information. The second information is associated with the authentication failure of the network slice.

Therefore, in this embodiment of the present invention, a session management function network element (for example, an SMF network element) may learn of the authentication failure of the network slice, and send the second information to the access and mobility management function network element, so that the access and mobility management function network element sends information to a terminal device, to reject access of the terminal device to the network slice whose authentication fails, thereby avoiding network congestion caused by frequent access of the terminal device to the network slice whose authentication fails, and reducing signaling interworking between the terminal device and a network.

Optionally, the sending module 1203 is further configured to send third information to the terminal device. The third information is used to indicate the authentication failure of the network slice, or the third information is used to indicate a cause of the authentication failure of the network slice.

Optionally, the second information is used to indicate the authentication failure of the network slice; or the second information is used to indicate that a quantity of authentication failures of the network slice is greater than or equal to a first threshold; or the second information is used to instruct the access and mobility management function network element to delete single network slice selection assistance information corresponding to the network slice from first allowed network slice selection assistance information, to generate second allowed network slice selection assistance information; or the second information is used to instruct the access and mobility management function network element to request the terminal device to perform deregistration.

Optionally, the second information includes timer information. The timer information is used to instruct to reject access of the terminal device to the network slice before a timer expires.

Optionally, the receiving module 1201 is further configured to receive timer information from an authentication network element; or the processing module 1202 is configured to obtain timer information from the session management function network element.

Optionally, the sending module 1203 is further configured to send timer information to the terminal device.

Optionally, the processing module 1202 is configured to determine that a quantity of authentication failures is greater than or equal to a first threshold.

In addition, the receiving module 1201, the processing module 1202, and the sending module 1203 in the network slice access control apparatus may further implement another operation or function of the SMF network element in FIG. 3 to FIG. 9. Details are not described herein again.

In another embodiment, the network slice access control apparatus shown in FIG. 12A may further be configured to perform an operation of the SMF network element in FIG. 9 and FIG. 10. An example is as follows.

The receiving module 1201 is configured to receive first information from an authentication network element. The first information is used to indicate an authentication failure of a network slice. The processing module 1202 is configured to obtain timer information. Before a timer expires, the processing module 1202 is further configured to reject access of a terminal device to the network slice.

Therefore, in this embodiment of the present invention, the session management function network element may learn of the authentication failure of the network slice, and obtain the timer information, to reject access of the terminal device to the network slice whose authentication fails before the timer expires, thereby avoiding network congestion caused by frequent access of the terminal device to the network slice whose authentication fails, and reducing signaling interworking between the terminal device and a network.

Optionally, the sending module 1203 is configured to send timer information to the terminal device.

Optionally, the receiving module 1201 is configured to receive timer information from the authentication network element; or the processing module 1202 is configured to obtain timer information from the session management function network element.

Optionally, the sending module 1203 is further configured to send second information to the terminal device. The second information is used to indicate the authentication failure of the network slice, or the second information is used to indicate a cause of the authentication failure of the network slice.

In addition, the receiving module 1201, the processing module 1202, and the sending module 1203 in the network slice access control apparatus may further implement another operation or function of the SMF network element in FIG. 9 and FIG. 10. Details are not described herein again.

In another embodiment, the network slice access control apparatus shown in FIG. 12A may further be configured to perform an operation of the terminal device in FIG. 3 to FIG. 11. An example is as follows.

The processing module 1202 is configured to obtain first information, and the processing module 1202 is further configured to be disallowed access to a network slice based on the first information.

Therefore, in this embodiment of the present invention, a terminal device is disallowed, based on the first information, access to the network slice whose authentication fails, so that network congestion caused by frequent access of the terminal device to the network slice is avoided, and signaling interworking between the terminal device and a network is reduced.

Optionally, the processing module 1202 is configured to obtain the first information from the terminal device. The first information includes second timer information. The receiving module 1201 is configured to receive second information from a session management function network element. The second information is used to indicate an authentication failure of the network slice, or the second information is used to indicate a cause of an authentication failure of the network slice. The processing module 1202 is configured to: respond to the second information, and before a second timer expires, disallow the terminal device to access the network slice.

Optionally, the receiving module 1201 is configured to receive the first information from a session management function network element. The first information includes first timer information, and the first information is used to instruct to reject access of the terminal device to the network slice before a first timer expires.

Optionally, the receiving module 1201 is configured to receive the first information from an access and mobility management function network element. The first information is second allowed network slice selection assistance information generated by the access and mobility management function network element after deleting single network slice selection assistance information corresponding to the network slice from first allowed network slice selection assistance information; or the first information is used to request the terminal device to perform deregistration.

Optionally, the receiving module 1201 is further configured to receive third information from a session management function network element. The third information is used to indicate an authentication failure of the network slice, or the third information is used to indicate a cause of an authentication failure of the network slice.

In addition, the receiving module 1201, the processing module 1202, and the sending module 1203 in the terminal device may further implement another operation or function of the terminal device in FIG. 3 to FIG. 11. Details are not described herein again.

Figure 12B:
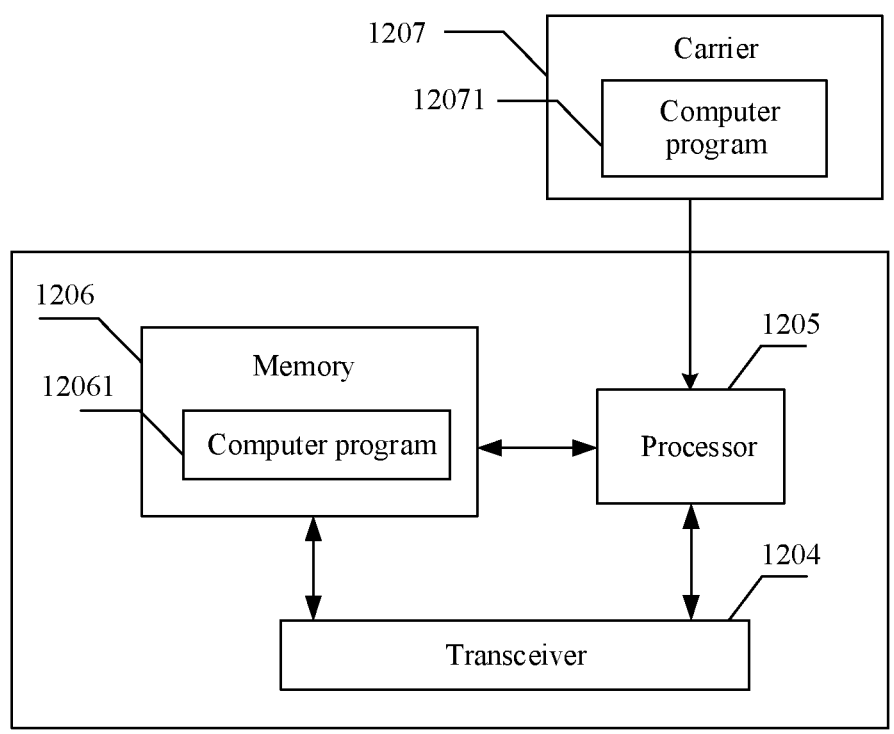

FIG. 12B is another possible schematic structural diagram of the network slice access control apparatus/the terminal device in the foregoing embodiments. The network slice access control apparatus/the terminal device includes a transceiver 1204 and a processor 1205, as shown in FIG. 12B. For example, the processor 1205 may be a general-purpose microprocessor, a data processing circuit, an application-specific integrated circuit (application specific integrated circuit, ASIC), or a field programmable gate array (field-programmable gate arrays, FPGA) circuit. The network slice access control apparatus/the terminal device may further include a memory 1206. For example, the memory is a random access memory (random access memory, RAM). The memory is configured to couple to the processor 1205, and the memory stores a computer program 12061 necessary for the network slice access control apparatus/the terminal device.

In addition, the network slice access control apparatus/the terminal device in the foregoing embodiments further provides a carrier 1207. The carrier stores a computer program 12071 of the network slice access control apparatus/terminal device, and may load the computer program 12071 to the processor 1205. The carrier may be an optical signal, an electrical signal, an electromagnetic signal, or a computer-readable storage medium (for example, a hard disk).

When the computer program 12061 or 12071 is run on a computer (for example, the processor 1205), the computer may be enabled to perform the foregoing methods.

For example, in an embodiment, the processor 1205 is configured to perform another operation or function of an AMF network element. The transceiver 1204 is configured to implement communication between the network slice access control apparatus and a session management function network element/a terminal device/a UDM network element.

In another embodiment, the processor 1205 is configured to perform another operation or function of an SMF network element. The transceiver 1204 is configured to implement communication between the network slice access control apparatus and an access and mobility management function network element/a terminal device/an authentication network element.

In another embodiment, the processor 1205 is configured to perform another operation or function of a terminal device. The transceiver 1204 is configured to implement communication between the terminal device and an access and mobility management function network element/a session management function network element.

A controller/processor configured to perform the foregoing radio access network device in this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of the DSP and a microprocessor.

Steps of the methods or algorithms described in combination with the content disclosed in this application may be implemented by hardware, or may be implemented by a processor by executing a software instruction. The software instructions may include a corresponding software module, and the software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a radio access network device. Certainly, the processor and the storage medium may alternatively exist in the radio access network device as discrete components.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk (SSD)), or the like.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A network slice access control method, comprising:
   determining, by an access and mobility management function network element, first allowed network slice selection assistance information of a terminal device in a registration process to register the terminal device to a network;
   learning, by the access and mobility management function network element, of an authentication failure of a first network slice corresponding to first single network slice selection assistance information from the first allowed network slice selection assistance information;
   in response to that there is no other single network slice selection assistance information in the first allowed network slice selection assistance information, sending, by the access and mobility management function network element, first information to the terminal device; and
   requesting, by the terminal device in response to the first information, to deregister from the network.

2. The method according to claim 1, wherein the learning, by the access and mobility management function network element, of the authentication failure of the first network slice comprises:
  learning, by the access and mobility management function network element, of the authentication failure of the first network slice from an authentication network element.

3. The method according to claim 2, wherein the authentication network element is integrated in an authentication server function.

4. The method according to claim 2, wherein the authentication network element is located in a third-party network.

5. The method according to claim 1, further comprising:
  determining, by an authentication network element, that an authentication process based on a network slice granularity for the first network slice has failed.

6. The method according to claim 1, wherein that there is no other single network slice selection assistance information in the first allowed network slice selection assistance information comprises:
  the first allowed network slice selection assistance information comprises only the first single network slice selection assistance information; or
  the first allowed network slice selection assistance information comprises a plurality of pieces of single network slice selection assistance information that comprise the first single network slice selection assistance information, and authentication on network slices corresponding to the plurality of pieces of single network slice selection assistance information fail.

7. The method according to claim 1, wherein before learning the authentication failure of the first network slice, the method further comprises:
  sending, by the access and mobility management function network element, the first allowed network slice selection assistance information to the terminal device in a registration procedure; and
  receiving, by the terminal device, the first allowed network slice selection assistance information.

8. The method according to claim 1, further comprising:
  sending, by the terminal device, a deregistration accept message to the access and mobility management function network element, wherein the deregistration accept message is for confirming with the access and mobility management function network element that the terminal device accepts deregistration request.

9. A network slice access control system, comprising:
  an access and mobility management function network element, configured to;
    determine first allowed network slice selection assistance information of a terminal device in a registration process to register the terminal device to a network;
    learn of an authentication failure of a first network slice corresponding to first single network slice selection assistance information from the first allowed network slice selection assistance information; and
    in response to that there is no other single network slice selection assistance information in the first allowed network slice selection assistance information, send first information to the terminal device;
  the terminal device, configured to:
    deregister from the network in response to receiving the first information.

10. The system according to claim 9, wherein the access and mobility management function network element is configured to learn of the authentication failure of the first network slice from an authentication network element.

11. The system according to claim 10, wherein the authentication network element is integrated in an authentication server function.

12. The system according to claim 10, wherein the authentication network element is located in a third-party network.

13. The system according to claim 9,
  wherein an authentication network element is configured to determine that an authentication process based on a network slice granularity for the first network slice has failed.

14. A network slice access control method, comprising:
  receiving, by a terminal device, first information sent by an access and mobility management function network element after the access and mobility management function network element learns of an authentication failure of a network slice corresponding to single network slice selection assistance information from allowed network slice selection assistance information, wherein the first information is used to cause the terminal device to perform deregistration, the allowed network slice selection assistance information is obtained in a registration procedure; and
  performing, by the terminal device, deregistration based on the first information.

15. The method according to claim 14, wherein the allowed network slice selection assistance information comprises selection assistance information of one or more single network slices, the receiving by the terminal device, the first information comprises:
  after a network slice corresponding to the selection assistance information of the one or more single network slices are authenticated failure, receiving, by the terminal device, first information sent by an access and mobility management function network element after the access and mobility management function network element learns of the authentication failure of the one network slice corresponding to selection assistance information of the one single network slice from allowed network slice selection assistance information.

16. An apparatus, comprising a processor, wherein
  the processor is configured to read a program from a memory and run the program, to perform:
  receiving, first information sent by an access and mobility management function network element after the access and mobility management function network element learns of an authentication failure of a network slice corresponding to single network slice selection assistance information from allowed network slice selection assistance information, wherein the first information is used to cause the apparatus to perform deregistration, the allowed network slice selection assistance information is obtained in a registration procedure; and
  performing deregistration based on the first information.

17. The apparatus according to claim 16, wherein the allowed network slice selection assistance information comprises selection assistance information of one or more single network slices, the apparatus receives the first information comprises:
  after a plurality of single network slices corresponding to the selection assistance information of the one or more single network slices are authenticated failure, receiving first information sent by an access and mobility management function network element after the access and mobility management function network element learns of the authentication failure of the plurality of single network slices corresponding to selection assistance information of the plurality of single network slices from allowed network slice selection assistance information.

\* \* \* \* \*